US009298778B2

(12) United States Patent
Evans et al.

(10) Patent No.: US 9,298,778 B2
(45) Date of Patent: Mar. 29, 2016

(54) PRESENTING RELATED CONTENT IN A STREAM OF CONTENT

(71) Applicant: Google Inc., Mountain View, CA (US)

(72) Inventors: Brynn Marie Evans, San Francisco, CA (US); Shimrit Ben-Yair, Sunnyvale, CA (US); Jonathan Terleski, San Francisco, CA (US); John Cassidy, San Jose, CA (US); Michael Thomas Leotta, San Francisco, CA (US); Dave Carlsson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 13/894,392

(22) Filed: May 14, 2013

(65) Prior Publication Data

US 2014/0344288 A1    Nov. 20, 2014

(51) Int. Cl.
*G06F 7/00* (2006.01)
*G06F 17/00* (2006.01)
*G06F 17/30* (2006.01)

(52) U.S. Cl.
CPC ...... *G06F 17/3053* (2013.01); *G06F 17/30867* (2013.01); *G06F 17/30873* (2013.01)

(58) Field of Classification Search
CPC .................. G06F 17/30864; G06F 17/30716; G06F 17/30873
USPC .................. 707/3, 769; 715/739; 375/240.15; 463/30; 709/208
See application file for complete search history.

(56) References Cited

U.S. PATENT DOCUMENTS

| 8,694,607 | B2 * | 4/2014 | Darnell et al. ............... 709/218 |
| 2003/0208482 | A1 * | 11/2003 | Kim et al. ......................... 707/3 |
| 2006/0248063 | A1 * | 11/2006 | Gordon ............................. 707/3 |
| 2007/0150457 | A1 | 6/2007 | Goldman et al. |
| 2010/0035682 | A1 * | 2/2010 | Gentile et al. .................. 463/30 |
| 2012/0016901 | A1 * | 1/2012 | Agarwal et al. ............... 707/769 |
| 2014/0164938 | A1 * | 6/2014 | Petterson et al. ............. 715/739 |
| 2014/0301464 | A1 * | 10/2014 | Wu et al. .................. 375/240.15 |

FOREIGN PATENT DOCUMENTS

WO    2004095314 A2    11/2004

OTHER PUBLICATIONS

International Search Report and Written Opinion, PCT/US2014/035708 mailed Sep. 2, 2014, 12 pages.
Turveen et al., Constructing, Organizing, and Visualizing Collections of Topically Related Web Resources, ACM Transactions on Computer-Human Interaction, vol. 6, No. 1, Mar. 1999, pp. 67-94.

* cited by examiner

*Primary Examiner* — Susan Chen
(74) *Attorney, Agent, or Firm* — Patent Law Works LLP

(57) ABSTRACT

A system including a processor and a memory storing instructions that, when executed, cause the system to: receive a stream of content including a plurality of content items; retrieve a plurality of related content items; identify a topic for at least one of the plurality of the related content items; rank the topics by relevance to the user and one of the plurality of items; associate the topic to the content item in the stream of content where the topic is ranked as being relevant to the content item; generate a marker for the topic; generate an interface including the marker associated with the content item in the stream of content; and provide the interface for display.

21 Claims, 22 Drawing Sheets

PRESENTING RELATED CONTENT IN A STREAM OF CONTENT

BACKGROUND

There are a number of services or computing platforms that have proliferated recently. For example, social networks, videos viewing services, email services or document services based in the cloud or accessible via the Internet have all become popular. While many users may join such services, they have difficulty using many of the features offered by such systems and accessing the information provided by such systems.

Interfaces for providing information often provide the information in multiple windows and the user must switch between different windows to access different information. This is a feature in existing applications including social networking where many types of different information are presented. Having to switch between different windows may make it difficult for the user to track their progression through content while exploring new content and then returning to the point at which they began their exploration. In some instances, the users may not bother exploring new content because of the impediments in the user interface.

SUMMARY

According to one innovative aspect of the subject matter in this disclosure, a system including a processor and a memory storing instructions that, when executed, cause the system to: receive a stream of content including a plurality of content items; retrieve a plurality of related content items; identify a topic for at least one of the plurality of the related content items; rank the topics by relevance to the user and one of the plurality of items; associate the topic to the content item in the stream of content where the topic is ranked as being relevant to the content item; generate a marker for the topic; generate an interface including the marker associated with the content item in the stream of content; and provide the interface for display.

In general, another innovative aspect of the subject matter described in this disclosure may be embodied in methods that include: receiving a stream of content including a plurality of content items; retrieving a plurality of related content items; identifying a topic for at least one of the plurality of the related content items; ranking the topics by relevance to the user and one of the plurality of items; associating the topic to the content item in the stream of content where the topic is ranked as being relevant to the content item; generating a marker for the topic; generating an interface including the marker associated with the content item in the stream of content; and providing the interface for display. receiving a stream of content including a plurality of content items; retrieving a plurality of related content items; identifying a topic for at least one of the plurality of the related content items; ranking the topics by relevance to the user and one of the plurality of items; associating the topic to the content item in the stream of content where the topic is ranked as being relevant to the content item; generating a marker for the topic; generating an interface including the marker associated with the content item in the stream of content; and providing the interface for display.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include updating the interface to the show the topics associated with the marker in response to input of cursor movement proximate the marker, or receiving input selecting a topic; generating a tile including the related content item corresponding to the topic; and providing the tile for display in situ in place of the content item in the stream of content. For instance, the features may further include each of the content items is presented as a tile in a stream of content and the marker is presented as a hash tag on the tile representing the associated item of content; there are a plurality of markers generated for the topic, and a predetermined number of markers are displayed with the content item in the stream of content; there are less than a predefined percentage of content items that have markers for topics associate with the content items; the plurality of related content items are algorithmically surfaced from a social network content source to retrieve high quality topics per content item; and a vector and a direction of input are used to update the generated interface to show in situ with the stream of content, control or status information.

These implementations are particularly advantageous in a number of respects. For instance, the technology described herein modifies the stream of content to include markers or indicators that can be used to discover additional related content. This is advantageous because it unobtrusively notifies the user that additional related content is discoverable. Additionally, if the user decides to select one of the indicators, the related content is presented in situ in the stream of content in place of the original content item. This is particularly advantageous because the user does not the need to divert his or her attention from the stream of content to view the related content. It is presented in situ and in context such that the user immediately knows the route traversed to view the related content. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure relates to a system and methods for presenting related content in situ in a stream of content. The presentation of related content to the user is adapted to the context of the user, and is done in a way that allows the user to easily identify and recognize his or her point of origin before exploring and reviewing the related content. While the present disclosure is described below in the context of generating and presenting related content in situ in a stream of content provided by a social network, it should be understood that the principles of the present disclosure are applicable to other areas. For example, the present disclosure may be applied to presenting related content in a broader system that includes email, video sharing, social networking, calendaring, mapping, music sharing, newsfeeds, online documents, spreadsheets, presentations, storage, etc.

Figure 1:
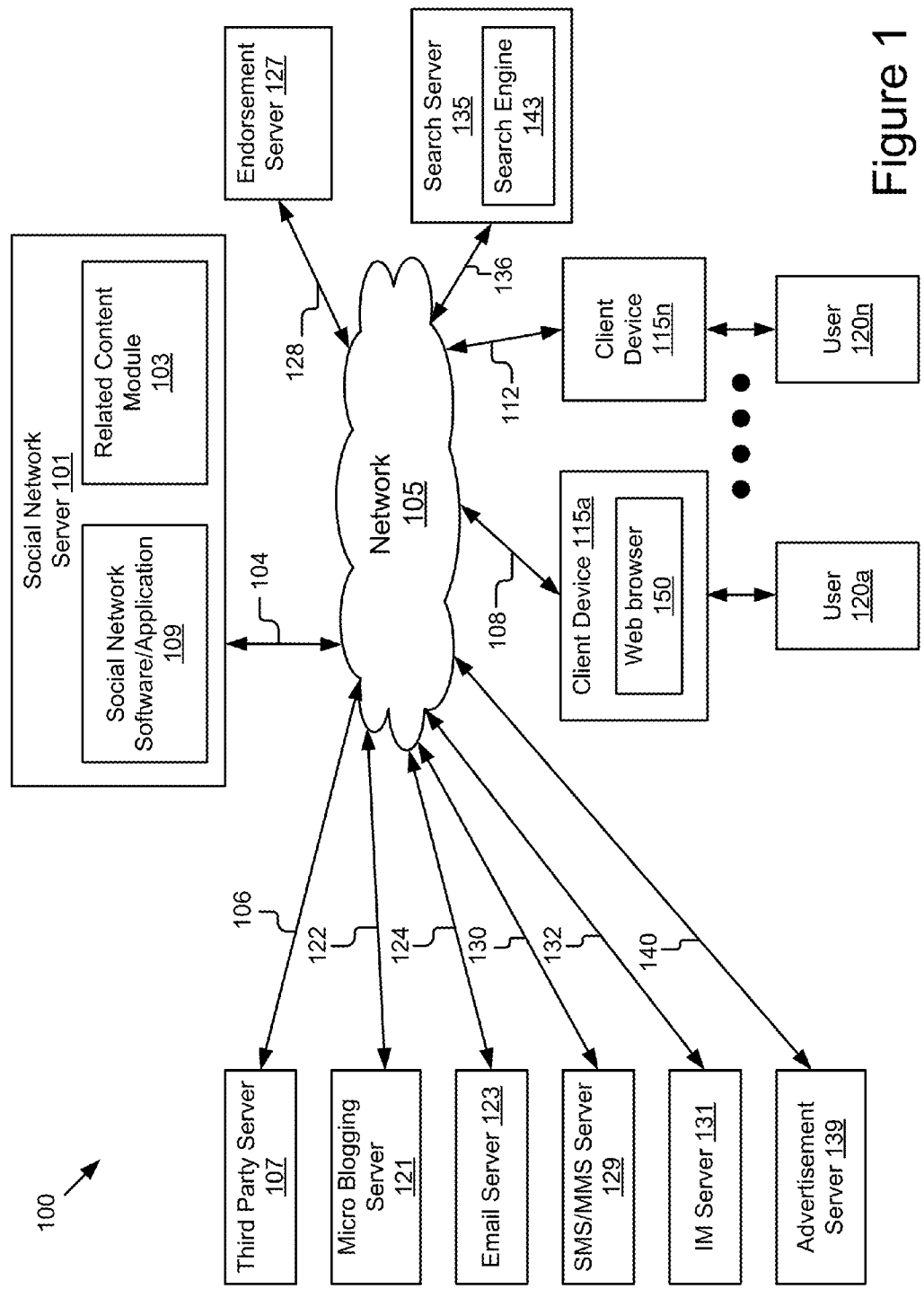
FIG. 1 is a block diagram illustrating an example system for presenting related content in situ in a stream of content.

FIG. 1 illustrates a block diagram of a system 100 for presenting related content in situ in a stream of content according to some implementations of the present disclosure. The illustrated system 100 includes client devices 115a-115n (also referred to herein individually and collectively as 115) that are accessed by users 120a-120n (also referred to herein individually and collectively as 120), and a social network server 101 having a user interaction improvement module 103. The system 100 also includes a number of products or services offered by a social network server 101, a third party server 107, a micro blogging server 121, an email server 123, a Short Message Service (SMS)/Multimedia Messaging Service (MMS) server 129, an Instant Messaging (IM) server 131, a search server 135, an endorsement server 127 and an advertisement server 139. In the illustrated implementation, these entities are communicatively coupled via a network 105. These other systems 101, 107, 121, 123, 127, 129, 131, 135 and 139 are merely examples and the system 100 in some implementations includes a document server, a blogging server, a news feed server, a video sharing server, a photo sharing server, a map server and any other third party server, etc.

The client devices 115a-115n in FIG. 1 are used by way of example. While FIG. 1 illustrates two client devices 115a and 115n, the present disclosure applies to any system architecture having one or more client devices 115. Furthermore, while only one network 105 is coupled to the client devices 115a-115n, the social network server 101 and the other product servers 107, 121, 123, 127, 129, 131, 135, and 139, in practice one or more networks 105 can be connected to the entities. Furthermore, while only one third party server 107 is shown, the system 100 may include one or more third party servers 107.

In some implementations, the social network server 101 is coupled to the network 105 via signal line 104. The social network server 101 also includes a social network software/application 109. Although only one social network server 101 is shown, it should be recognized that multiple servers may be present. A social network may be any type of social structure where the users are connected by a common feature. The common feature includes relationships/connections, e.g., friendship, family, work, an interest, etc. The common features are provided by one or more social networking systems, for example, those included in the system 100, including explicitly-defined relationships and relationships implied by social connections with other online users, where the relationships form a social graph. In some examples, the social graph can reflect a mapping of these users and how they are related. Furthermore, it should be understood that the social network server 101 and the social network software/application 109 are representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others of general interest or a specific focus.

While shown as operational on the social network server 101 in FIG. 1, in some implementations all or part of the related content module 103 may be operational on the third party server 107 or any other servers 101, 121, 123, 127, 129, 131, 135 and 139. The related content module 103 interacts with the other servers 101, 107, 121, 123, 127, 129, 131, 135 and 139 via the network 105. The related content module 103 is also coupled for communication with the client device 115a, which is connected to the network 105 via signal line 108. The user 120a interacts with the client device 115a. Similarly, the client device 115n is coupled to the network 105 via signal line 112 and the user 120n interacts with the client device 115n. It should be recognized that the related content module 103 can be stored in any combination of the devices and servers, or in only one of the devices or servers.

The network 105 may be a conventional type, wired or wireless, and may have any number of configurations, for example, a star configuration, token ring configuration or other configurations. Furthermore, the network 105 may include a local area network (LAN), a wide area network (WAN) (e.g., the Internet), and/or any other interconnected data path across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth communication networks or a cellular communications network for sending and receiving data, e.g., via short messaging service (SMS), multimedia messaging service (MMS), hypertext transfer protocol (HTTP), direct data connection, WAP, email, etc.

The social network server 101 is coupled to the network 105 via signal line 104 for communication and cooperation with the other components of the system 100. The social network server 101 interacts with the third party server 107 that is coupled to the network 105 via signal line 106, the micro blogging server 121 that is coupled to the network 105 via signal line 122, the email server 123 that is coupled to the network 105 via signal line 124, the Short Message Service (SMS)/Multimedia Messaging Service (MMS) server 129 that is coupled to the network 105 via signal line 130, the instant messaging (IM) server 131 that is coupled to the network 105 via signal line 132, the search server 135 that is coupled to the network 105 via signal line 136, the endorsement server 127 that is coupled to the network 105 via signal line 128 and/or the advertisement server 139 that is coupled to the network 105 via signal line 140.

In some implementations, the social network server 101 receives and sends data and social information provided by the other systems 107, 121, 123, 127, 129, 131, 135 and 139 in a social network. For example, the social network server 101 receives and sends any social information or events performed on any web pages and/or applications hosted by the other systems 101, 107, 121, 123, 129, 131, 135 and 139. The web pages and/or applications include a user interface allowing a user to comment or endorse a product, a video, a search result, a widget, a post, a comment, a photo, an article, etc., shown on the web pages and/or applications.

In some implementations, the social network server 101, the third party server 107, the micro blogging server 121, the email server 123, the endorsement server 127, the SMS/MMS server 129, the IM server 131, the search server 135 and the advertisement server 139 are hardware servers including a processor, a memory, and network communication capabilities. The client devices 115 can be portable computing devices. It should be understood that these systems 101, 107, 115, 121, 123, 127, 129, 131, 135 and 139 could be any computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. As will be described below, it should be understood that the present technologies can operate on different models other than a client-server architecture. For example, the client devices 115 may include the related content module 103 and include different services.

Figure 2:
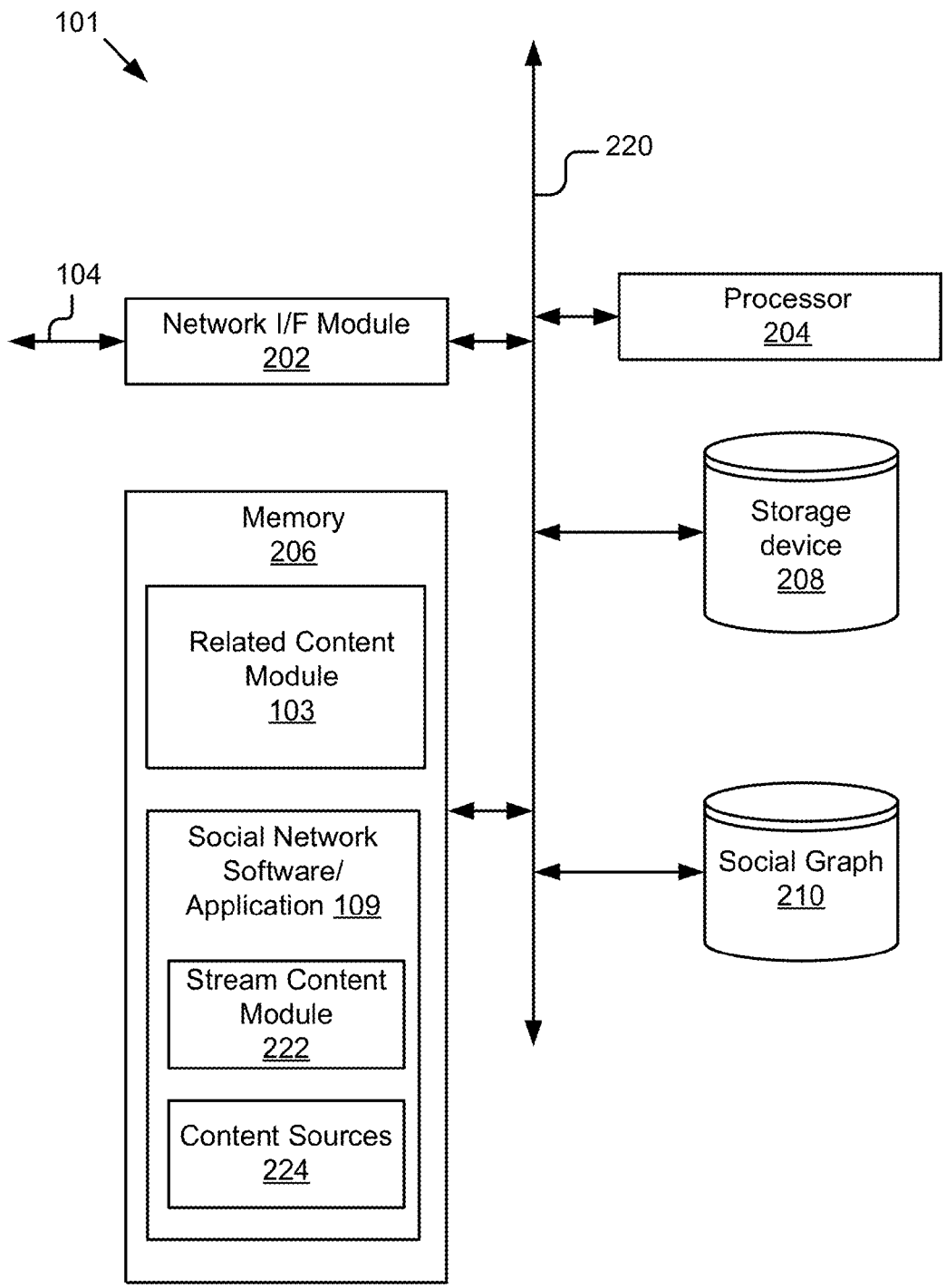
FIG. 2 is a block diagram illustrating an example social network server including a related-content module.

FIG. 2 illustrates the social network server 101 according to some implementations of the present disclosure. In this implementation, the social network server 101 includes the network interface (I/F) module 202, a processor 204, a memory 206, a storage device 208 and a social graph 210. These components of the social network server 101 are communicatively coupled to a bus or software communication mechanism 220 for communication with each other.

The network interface module 202 is coupled to the network 105 by signal line 104. The network interface module 202 is also coupled to the bus 220. The network interface module 202 includes ports for wired connectivity including but not limited to USB, SD, or CAT-5, etc. The network interface module 202 links the processor 204 to the network 105 that may in turn be coupled to other processing systems. The network interface module 202 provides other conventional connections to the network 105 using standard network protocols, e.g., TCP/IP, HTTP, HTTPS and SMTP. In some implementations, the network interface module 202 includes a transceiver for sending and receiving signals using WiFi, Bluetooth® or cellular communications for wireless communication.

The processor 204 may include an arithmetic logic unit, a microprocessor, a general purpose controller or some other processor array to perform computations and provide electronic display signals to a display device. The processor 204 is coupled to the bus 220 for communication with the other components. Processor 204 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It should be understood that other processors, operating systems, sensors, displays and physical configurations are possible.

The memory 206 stores instructions and/or data that may be executed by the processor 204. In the illustrated implementation, the memory 206 stores the related content module 103 and the social network application 109 having a stream content module 222. The memory 206 may also store content sources 224 or have access to content sources stored on non-volatile media (not shown). The related content module 103 may cooperate with the social network application 109 to generate and present the related content in situ with a stream of content provided by the social network application 109. The operation of the related content module 103 is described in more detail below with reference to FIGS. 3-6. The related content module 103 may be software including routines for generating and presenting the related content in situ with the stream of content produced by the social network. In this application, the term "in situ" means in position or place of the stream of content or some portion of it, or proximate the stream of content or some portion of it. For example, the related content may be the back side of content item in the stream of content, in place of a content item, overlaid over a item or positioned near a content item in the stream of content. In some implementations, the related content module 103 may be a set of instructions executable by the processor 204 to provide the functionality described below for generating and presenting the related content in situ with the stream of content. In some implementations, the related content module 103 may be stored in the memory 206 of the server 101 and is accessible and executable by the processor 204. In some implementations, the related content module 103 may be adapted for cooperation and communication with the processor 204 and other components of the server 101 via bus 220.

The social network application 109 is shown as including the stream content module 222 and content sources 224. Based upon the user's interests, social graph, interactions and other factors, the social network application 109, in particular the stream content module 222, may generate a stream of content tailored to the interests of the user. As will be described below, the related content module 103 generates or retrieves related content, associates the related content with the content produced by the social network application, and presents the related content in situ near existing content in the stream of content. The content sources 224 may be stored in memory 206 or be in nonvolatile storage (not shown or storage 208) accessible by processor 204. The memory 206 is coupled to the bus 220 for communication with the other components. The instructions and/or data may include code for performing any and/or all of the techniques described herein. The memory 206 may be a dynamic random access memory (DRAM) device, a static random access memory (SRAM) device, flash memory or some other memory device.

The storage 208 may be a non-transitory memory that stores data. For example, the storage 208 may be a dynamic random access memory (DRAM) device, a static random access memory (SRAM) device, flash memory or some other memory device. In some implementations, the storage 208 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. The storage 208 may store content sources 224 in some implementations, and may be coupled for communication with the processor 204 and the social network application 109.

In some implementations, the social graph 210 may be a non-transitory memory that stores the social graph. In some examples, the social graph 210 can reflect a mapping of these users and how they are related. In some implementations, a social graph may be information that represents the relationships between the users in a social network. For example, users can be friends, acquaintances, have business relationships, one user can follow another user, one user can subscribe to another user, etc.

Software communication mechanism 220 may be an object bus, direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc). The software communication mechanism 220 can be implemented on any underlying hardware, for example, a network, the Internet, a bus, a combination thereof, etc.

Figure 3:
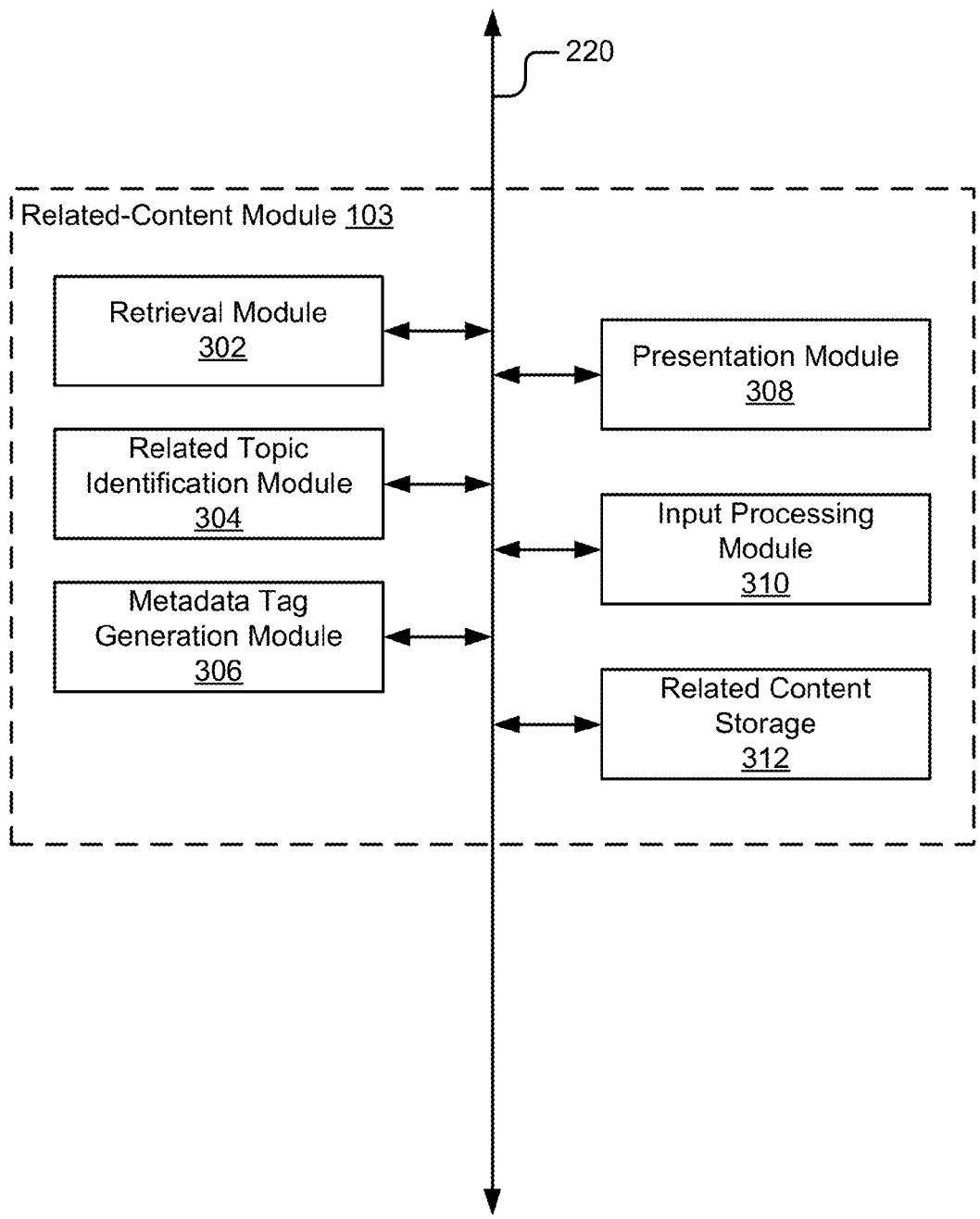
FIG. 3 is a block diagram illustrating an example related-content module.

As shown in FIG. 3, the related content module 103 is described in more detail. The related content module 103 includes a retrieval module 302, a related topic identification module 304, a metadata tag generation module 306, a presentation module 308, and input processing module 310, and a related content storage 312. Each of these components 302, 304, 306, 308, 310 and 312 may be coupled to the software communication mechanism 220 for communication with each other and the other components of the social network server 101.

The retrieval module 302 can be software or routines for receiving the stream of content and retrieving related content. The social network application 109 includes a variety of content sources (see 224 of FIGS. 2 and 4) that are used to by the social network application 109 to produce a stream of content including one or more content items. The stream of content may be content items, for example, videos, images, text, hypertext links or any other information posted, shared, endorsed, or otherwise sent by users to others in the social network. The social network application 109 processes the content sources, for example, with the stream content module 222 to generate a stream of content including one or more content items. The retrieval module 302 is communicatively coupled to receive the stream of content including a plurality of items from the stream content module 222. In some implementations, the retrieval module 302 requests and retrieves the stream of content for the user from the stream of content module 222.

In some embodiments, the functionality described below for the retrieval module 30 to the related topic identification module 304 and the meta-tag generation module 306 may be performed by the social network application 109 as content is generated and stored in the content sources 224. For example, as content items, e.g. posts, are submitted to the social network application and stored in the content sources 224, they may be tagged and indexed based on topic to which they relate. In some instances, the posts are tagged by their author and may be renamed by the social network application 109 or the related content module 103. This would allow queries of the content sources 224 to retrieve post based on popularity, social network, and topic.

The retrieval module 302 is also coupled to retrieve related content items from the stream content sources 224. The related content items are content items that are related to the user, the social graph of the user, or the content items in the stream of content. In some implementations, the related content items may be promoted content or advertisements. The related content items have a relationship or are "related" to the content items in the stream content. In some implementations, the retrieval module 302 surfaces high-quality topics related to the content items in the stream of content. The retrieval module 302 is coupled to the stream content sources 224 to retrieve these related content items from the stream content sources 224. In some implementations, the retrieval module 302 queries or fetches the stream content sources 224 for the related content items and topics. In some implementations, the retrieval module 302 processes the content items in the stream of content and produces topics from that processing. The retrieval module 302 can then use those topics to query a predetermined number of related content items for each topic. In some implementations, the stream content sources, has already sorted and categorized the related content items and rank them within categorization. In some implementations, the retrieval module 302 receives the related content items and topics from processes operating on the stream of content sources 224. For example, stream content sources 224 send the data to the retrieval module 302 at predetermined intervals. The retrieval module 302 is also coupled to related topic identification module 304 to provide the stream of content (content items) and the related content (related content items).

The related topic identification module 304 can be software or routines for identifying topic associated with the related content and then ranking the topics by relevance to the user and content items in the stream of content. The related topic identification module 304 provides a ranked list of topics for content items in a stream of content. In some implementations, not every content item in the stream of content will have associated topics. The related topic identification module 304 may also apply a threshold to the topic rankings such that only topics that satisfy the threshold or are of a certain quality are presented as related content along with the stream of content. This determination may be made with the related topic identification module 304 or with the metadata tag generation module 306 described below. For example, the number of content items in the stream of content having related content may be controlled using a threshold such that a predetermined percentage of content items in the stream of content will have related content. The related topic identification module 304 is communicatively coupled to the retrieval module 302 to receive related content items. In some implementations, the related contents items have one or more associated subject matter tags. This information along with the importance of particular topics to the user, the relationship of the author or creator to the user and other factors, may be used to rank the topics for relevance. In some implementations, the ranking is done on a content fly content item basis. The related topic identification module 304 is coupled to receive the related content items indirectly from the retrieval module 302 and the stream content module 222 or directly from the stream content sources 224. The related content items may be posts, photos, videos, endorsements, etc. that the social network application 109 determined are of interest to the user. The related topic identification module 304 receives these two types of information and blends them into a single list ranked by interest to the user. The global popularity and user models may also be used in ranking the related content. In some implementations, the related topic identification module 304 adjusts the ranking of topics by their relationship to content in the stream. In some implementations, the related topic identification module 304 uses information from the related content storage 312 to modify the rank of a topic. For example, to maintain diversity and the engagement of the user with the related content, the input processing module 310 may store information about what related content that the user has reviewed or engaged with and the level or extent of engagement; and provide different content, or provide more detailed information on topics of interest to the user. The related topic identification module 304 is coupled to the metadata tag generation module 306 to provide the ranked list of topics to the metadata tag generation module 306.

The metadata tag generation module 306 can be software or routines for selecting topics that will be provided for display and generating markers, indicators, metadata tags and other interfaces for those topics. The metadata tag generation module 306 is communicatively coupled to the related topic identification module 304 to receive a ranked list of topics and associated content items. In some implementations, the metadata tag generation module 306 identifies a predefined number of the ranked list of topics for display. For example, the metadata tag generation module 306 may provide one to three topics for each content item. In some implementations, this identification of a predetermined number of topics is determined by the related topic identification module 304. As noted above, the metadata tag generation module 306 may also control the number of content items a stream of content of content that are permitted to have associated related content. The metadata tag generation module 306 may also generate markers, indicators, metadata tags, cards, card decks, tombstones, and other interfaces for presenting related information in-line in the stream of content. Examples of the information generated by the metadata tag generation module 306 and inserted into the stream of content will be described in more detail below with reference to FIG. 7A-9D. The metadata tag generation module 306 generates markers, indicators, metadata tags, and other interfaces by retrieving information for the topics from the related content items provided by either the retrieval module 302 or directly from the stream content sources 224. In some implementations, the related topic identification module 304 stores the related content items in the related content storage 312 and the metadata tag generation module 306 retrieves it from the related content storage to produce the interfaces. In some implementations, the metadata tag generation module 306 may also organize and orders the related content and interfaces for display. In some implementations, the metadata tag generation module 306 retrieves information about the user display capabilities and provides information for adapting the organization and order to the display of the user. For example, the metadata tag generation module 306 may choose the location of the interfaces relative to the stream content to make sure the in situ presentation is preserved. In some implementations, the related content is placed near content item from the stream rather than in place of it.

The presentation module 308 can be software or routines for providing the markers, indicators, metadata tags, and other interfaces for display. In some implementations, the presentation module 308 sends the content items (e.g., the stream of content), the related content items, the markers, indicators, metadata tags, and other interfaces for to a client device 115 via bus 220 and network 105. The presentation module 308 is coupled to the related topic identification module 304, the metadata tag generation module 306 and the related content storage 312 via bus 220 to receive the content items, the related content items, the markers, indicators, metadata tags, and other interfaces. The presentation module 308 generates the user interfaces including the stream of content and the related content and provides them for display. In some implementations, the presentation module 308 also maintains context of the user interface, and updates the user interface in response to signals received from the user. The presentation module 308 is coupled to receive control signals from the input processing module 310 to control display of user interfaces, modifications of user interfaces and other user interaction. The presentation module 308 is coupled to the client device 115 to provide the stream of content, the related content and the user interfaces for display.

The input processing module 310 can be software or routines for receiving user input and translating the user input into control signals that are sent to the presentation module 308 for manipulating and controlling the user faces. For example, the input processing module 310 translates user input into navigation control signals for presenting and discovery of related content in situ. The possible input signals and controls will become apparent with reference to FIG. 7A-9D below. The input processing module 310 is coupled to receive signals from the client device 115 via bus 220 and network 105. The input processing module 310 is also coupled via bus 220 to provide control signals to the presentation module 308.

The related content storage 312 may be a data store for storing information about a user's preference or past interaction with related content. For example, the related content storage 312 may store information about whether the user is interested in having related content mixed in with the stream content. In some implementations, the related content storage 312 also stores when related content was provided to the user in the past, and the topics on related content that were and were not reviewed by the user. The information about past related content can also be used by the related topic identification module 304 in other ways to prioritize and rank topics. The related content storage 312 is coupled to provide this information to the ranking and scoring module 304. The related content storage 312 may also be a temporary storage for storing related content items so that they can be provided by the presentation module 308. The related content source 312 is coupled to the retrieval module 302 to receive related content items. The related content storage is also accessible by the metadata tag generation module 306 and the presentation module 3084 generation and presentation of the user interfaces.

Figure 4:
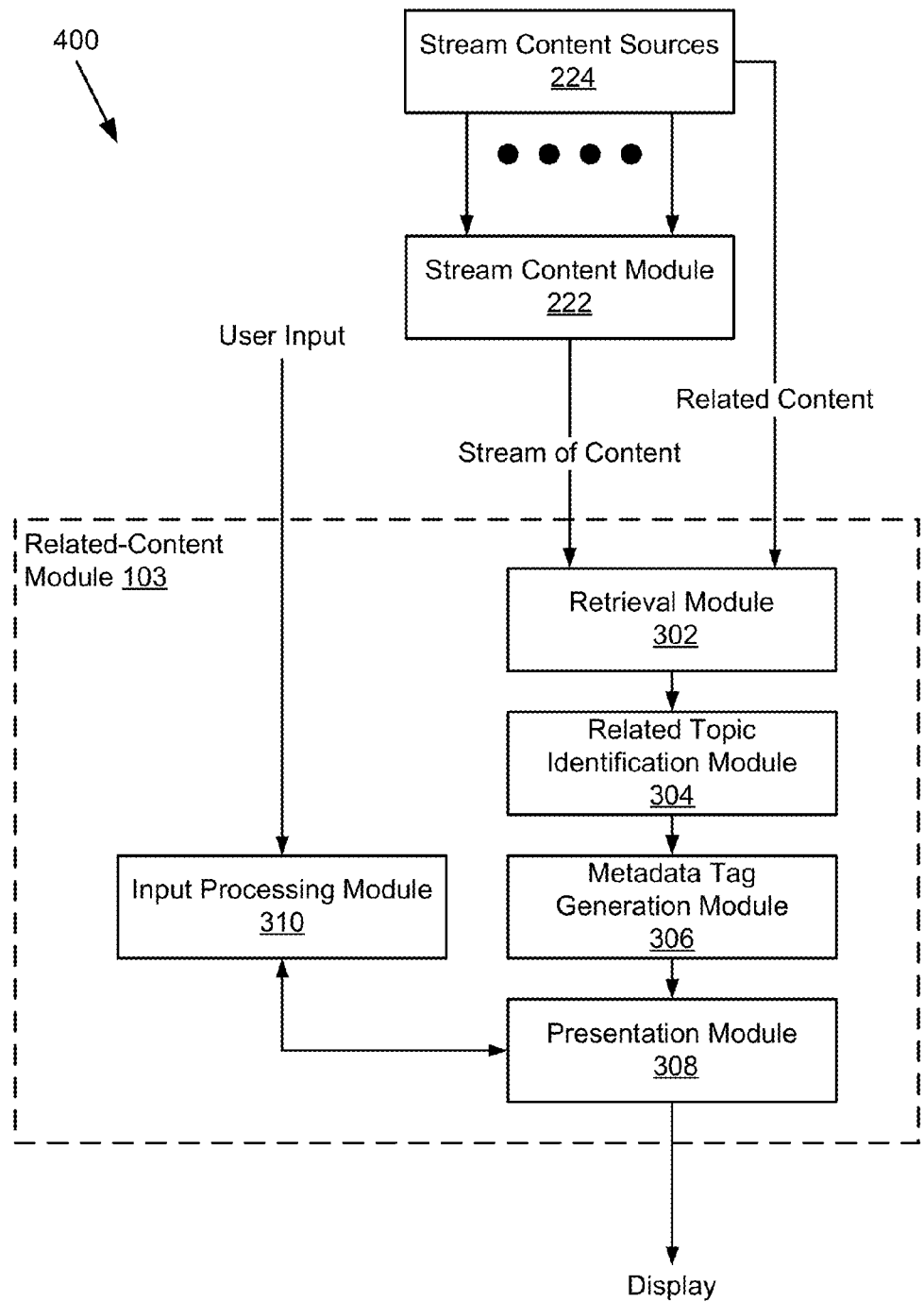
FIG. 4 is a flow diagram for an example related content module.

Referring now to FIG. 4, an example flow diagram of a process 400 implemented by the related content module 103 for retrieving, associating and presenting related content in situ in a stream of content generated by a social network application 109 is shown. The process 400 begins with stream content sources 224 providing a stream of content and a related content. The stream of content is formed of a plurality of content items. The related content is formed of a plurality of related content items. As noted above, the stream of content and the related content may be particular to a specific user, or may be aggregated data about users generally or sets of users. The stream content module 222 retrieves the stream of content provides it to the retrieval module 302. The retrieval module 302 also retrieves the related content from the stream content sources 224. In some implementations, the delivery of stream of content to the retrieval module 302 and the retrieval of the related content may occur in parallel. The retrieval module 302 in turn provides the content items and the related content items to the related topic identification module 304. The related topic identification module 304 ranks topics by relevance to the user and to the content items. The related topic identification module 304 provides the rankings to the metadata tag generation module 306. The metadata tag generation module 306 then selects topics that will be provided for display and generates markers, indicators, metadata tags and other interfaces for those topics. This information (the selected topics and interfaces) is provided by the metadata tag generation module 306 to the presentation module 308. While the related content has generally been described above as user content provided by others in the social network related to the content items, it should be understood that the related content could be promotions or advertisements related to the content item. Although not shown, the system may include sources for providing promotions or advertisements similar to the stream content sources 224. Such sources would be coupled to provide the promotions or advertisements to the retrieval module 302 in a manner similar to how related content is provided and processed. The presentation module 308 generates user interfaces for display from this information. The presentation module 308 provides those user interfaces as shown in FIG. 4. For example, the presentation module 308 generates the user interfaces of FIGS. 7A-9D including tiles for content items and markers and other mechanisms for showing related content in situ. The input module 310 is also coupled to receive user input. The input processing module 310 translates the user input to control signals and sends him to the presentation module 308. The presentation module 308 is coupled to the input processing module 310 to receive those control signals to modify the user interface faces.

Figure 5:
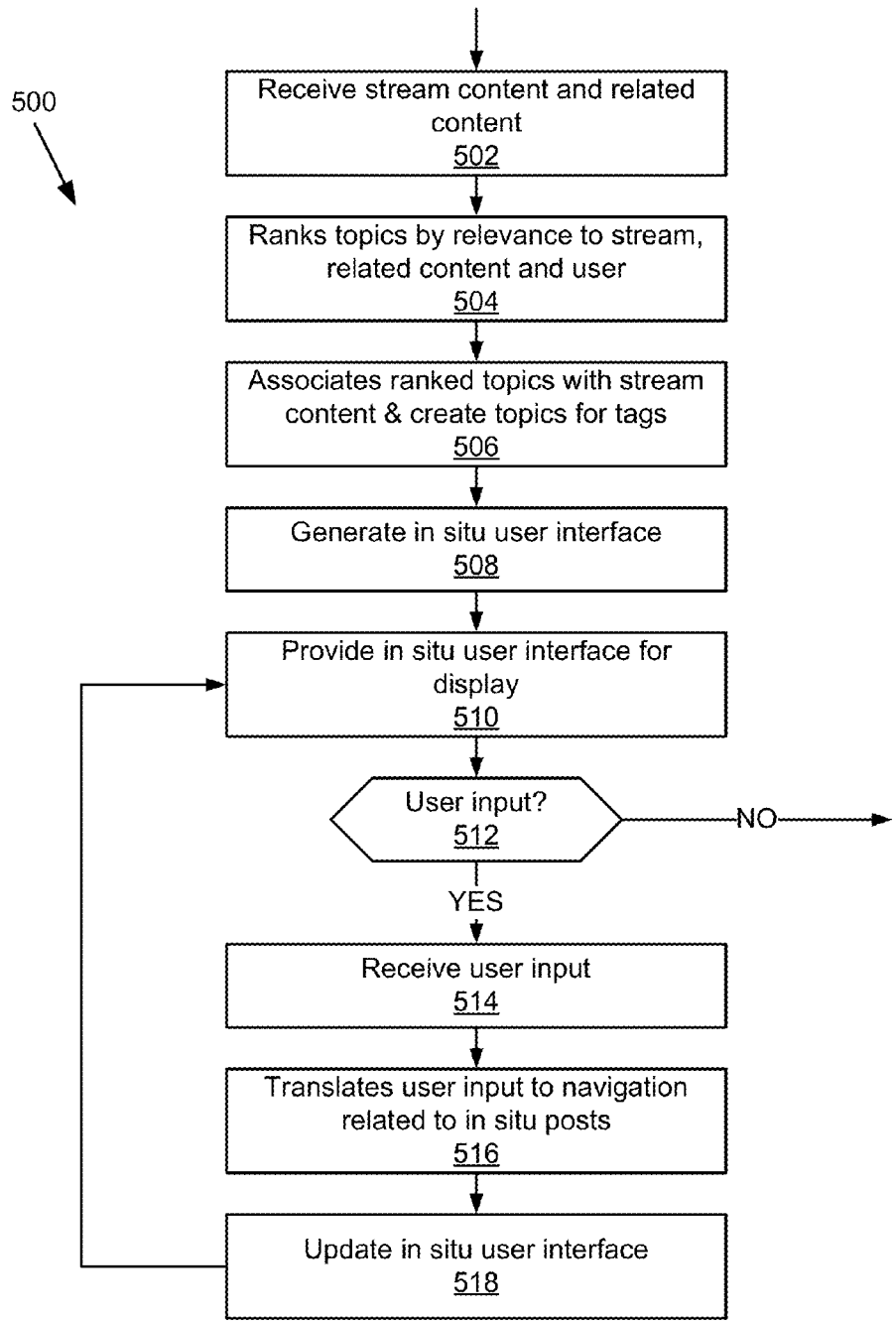
FIG. 5 is a flow chart illustrating an example method for presenting related content in situ.

Referring now to FIG. 5, an example method 500 for generating and providing a stream of content with related content displayed in situ is described. The method 500 begins by receiving 502 a stream of content and related content. As noted above in some implementations, the stream content module 222 provides a stream of content including content items to the retrieval module 302. For example, the stream content module 222 provides a stream of content adapted specifically to the user. The retrieval module 302 also retrieves related content including related content items from the stream content sources 224. Then the related topic identification module 304 ranks 504 topics by relevance to content items in the stream of content and to the user to create a list of ranked topics. It should be understood that the ranking 504 can also use a number of other factors to rank the topics, including but not limited to, the context of related content to the content item, the social graph the user, content that is popular, content that has not been viewed, content that is recent, content that is related to the user express or implied interests, etc. The ranked topics are then associated 506 with content items and the stream of content by the metadata tag generation module 306. The metadata tag generation module 306 also creates markers, indicators, metadata tags for the topics. Then the presentation module 308 generates 508 an in situ user interface for presenting the related content. The in situ interface is then provided 510 for display. The method 500 continues by determining 512 whether there has been any user input. If not, the method 500 is complete. However, if there is user input, the method 500 continues by receiving 514 the user input. The user input is provided to the input processing module 310. The input processing module 310 translates 516 the user input into navigation control signals related to the in situ posts. The navigation control signals are provided by the input processing module to the presentation module 308, and the presentation module 308 updates 518 the user interface with in situ related content. Then the presentation module 308 provides 510 the in situ user interface for display. As the user continues to provide input, the loop through steps 510 to 518 is repeated as various user interfaces as will be described below with reference to FIG. 7A-9D are presented to the user so that the user may discover related content.

Figure 6:
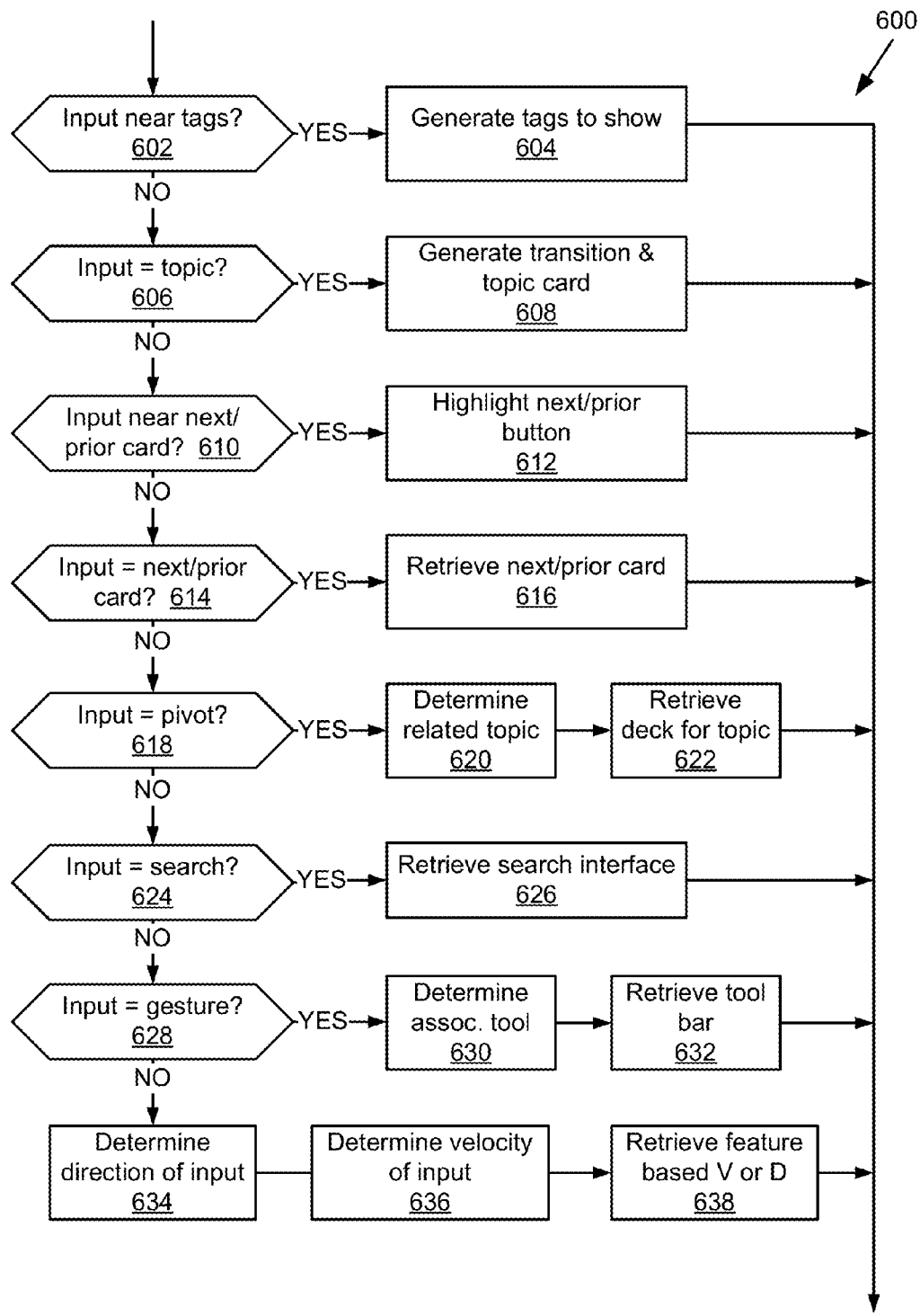
FIG. 6 is a flow chart illustrating example method for updating the user interface based on user input.

Referring now to FIG. 6, an example method 600 for method for updating the user interface based on user input will be described. For example, the method 600 of FIG. 6 provides more detail on the implementation of blocks 516 and 518 of FIG. 5. The method 600 begins by determining 602 where the input is near a marker or tag in the interface. If so, the method 600 generates 604 tags and updates display with them. The updating of displayed interface is shown in the transition between FIG. 7B or 7C to FIG. 7D. If not, the method 600 determines 606 whether the input was the selection of the topic. If so, the method 600 generates 608 a transition and a topic card (card back) for display. The updating of displayed interface is shown in the transition from FIG. 7C to FIG. 7D to FIG. 7E. It should be understood that once the user selected a topic, the related content module 103 provides an in-line experience allows the user to cycle through 4 to 5 related content items. The selected ("cornerstone") topic stays the same. The related topics will change according to the current related content item being displayed. If the input was not the selection of a topic, the method 600 continues from block 606 to block 610. In block 610, the method 600 determines whether the input was near the next card or prior card selection button. If so, the method 600 updates 612 the interface to highlight the next or prior button. An example of an updated display with the next button highlighted is shown in FIG. 8C. If not, the method 600 continues to determine 618 whether the input was to pivot to another related topic. While viewing a related topic, the user can transition or pivot to a further related topic. If the input was to pivot, the method 600 determines 620 the related topic and then retrieves 622 related content items for the topic and creates a card deck for display. If not, the method 600 proceeds to block 624 to determine whether the input was selection of the search button or link. If so, the method 600 retrieves 626 the search interface. If on the other hand the method 600 determined that the input was not a search, the method 600 determines 628 whether the input was a gesture. If so the method 600 determines 630 the tool associated with the gesture and then adds 632 the tool bar to the interface. Finally, if the input was not any of the above inputs, the method 600 determines 634 the direction of the user's input (cursor movement), determines 636 the velocity of the input, and retrieves 638 a feature, tool or information based on the velocity and the direction of the input. After block 604, 608, 612, 616, 622, 626, 632 or 638, the method 600 sends the updated interface to the user for display. It should be understood that many of the steps of FIG. 6, are performed by the presentation module 308.

Figure 7A:
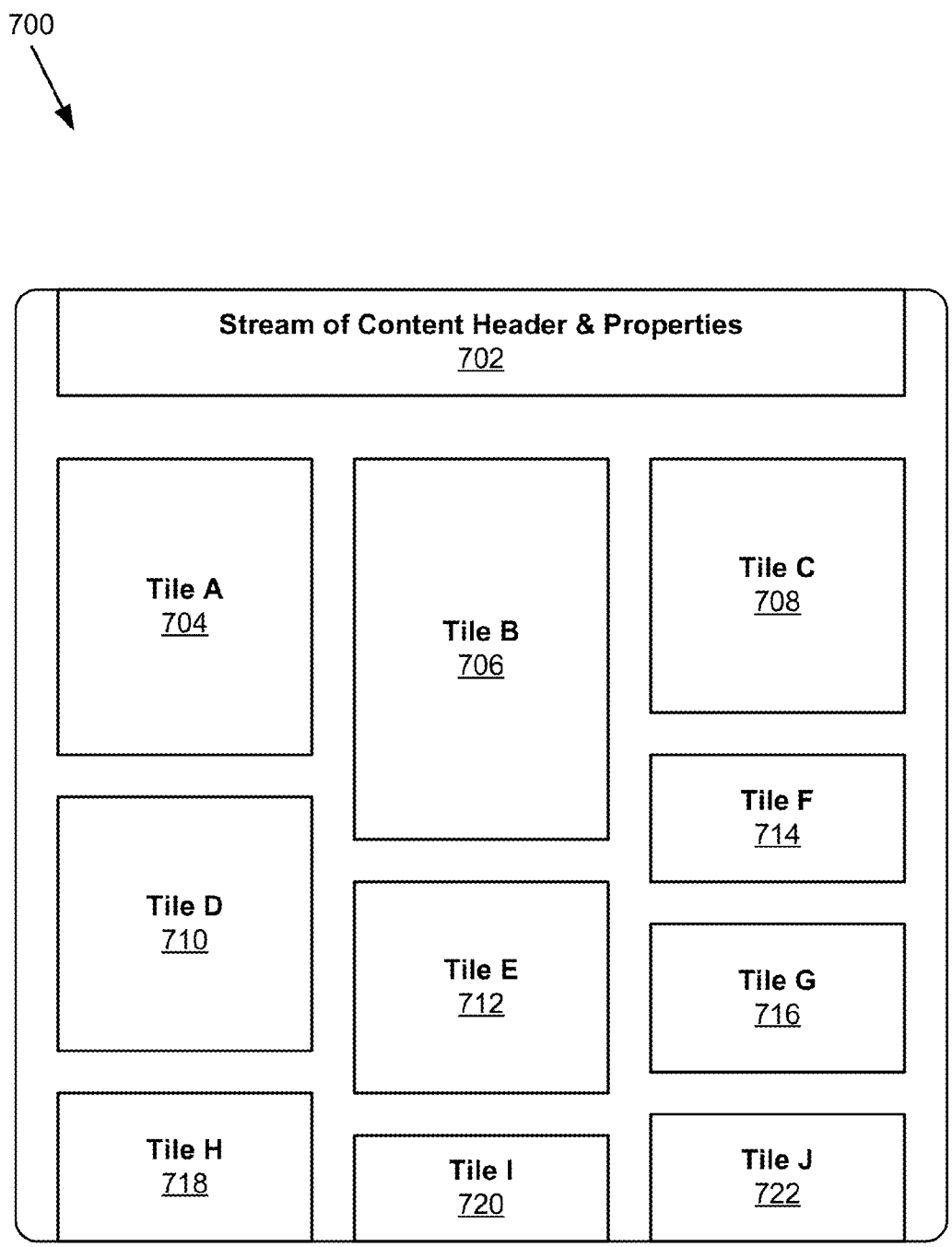
FIG. 7A is a graphic representation of an example user interface for presenting a stream of content.

FIG. 7A is a graphic representation of an example user interface 700 for presenting a stream of content. The user interface 700 includes a top window area 702 for a header and properties, and a plurality of tiles 704-722 (tile A to tile J). The tiles 704-722 correspond to a content item of the stream of content. In this implementation, the user interface 700 includes three columns of tiles. However, it should be understood that other implementations of the user interface 700 may have fewer or greater numbers of columns. For example, for a mobile device (not shown), the user interface may only include a single column of tiles. Each tile 704-722 may vary in height depending on the content being presented, user preferences, window size, etc. Although not shown, each tile 704-720 may include text, posts, graphic images, photos, thumbnail images of videos, links, action buttons, etc. Each tile 704-720 may also include functional buttons for expanding or minimizing the size of the tile. In general, the tiles 704-722 are ordered left to right and top to bottom by order of rank. For example, tile C 708 at the end of the first row has a higher rank than tile D 710 at the beginning of the second row of tiles. It should be noted that FIG. 7A illustrates the user interface 700 with no related content markers, tags or information, and including only tiles corresponding to content items.

Figure 7B:
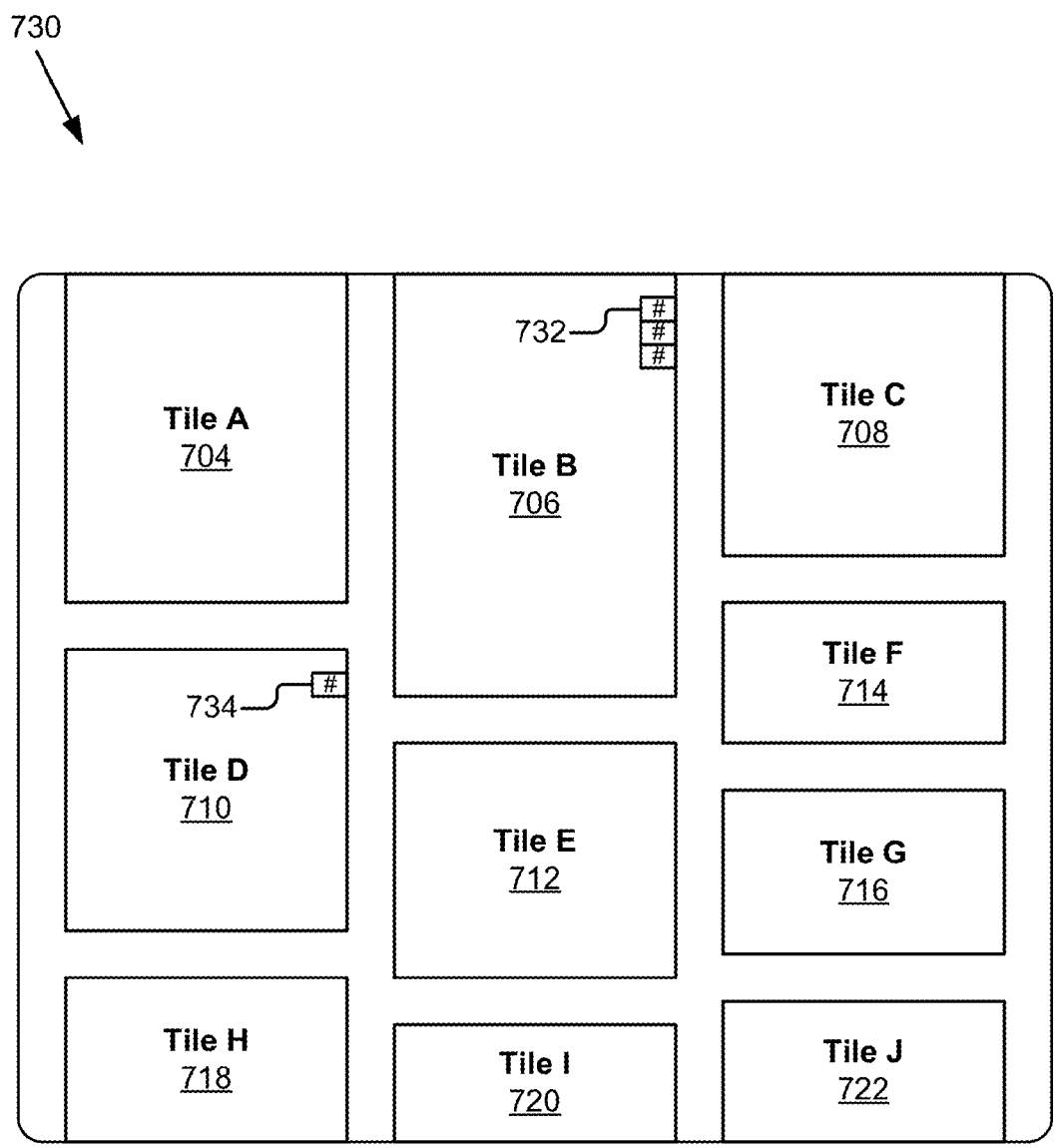
FIGS. 7B-7G are a graphic representation of an example user interface for presenting a stream of content and indication for related content or related content in situ.

FIG. 7B is a graphic representation of an example implementation of a user interface 730 for presenting a stream of content and markers or indicators 732, 734 of related content. The user interface 730 includes a plurality of tiles 704-722

(tile A to tile J). In this implementation, the tiles 704-722 forming the stream of content are arranged in three columns ordered by rank left to right and top to bottom.

The related content module 103 advantageously adds markers or indicator 732, 734 of related content to those tiles 706, 710 that have related content. It should be noted that each of the tiles 704-722 represents a content item. In this example, related content module 103 adds a visual indication in the form of a marker or indicator near the side of the tiles 706, 710 having related content. For example tile D 710 has a single related topic and thus has a single marker in the form of #. Similarly, tile B 706 has three related topics and thus has three markers near the upper right corner. In some implementations, there is a maximum number of topics, for example three, that make may be presented for any tile (content item). In some implementations, there is also a maximum number (e.g., 30%) of tiles that may have related content. By having a maximum number of tiles that may have related content ensures that the related content has a high-quality and is perceived by the user as something worth investigating and discovering. It should be understood that the example formats of the markers for related content are merely examples, and any mechanism that provides a visual indication that there is associated related content could be used. It should also be understood that the markers or indicators may be of different colors, graphics, shapes, icons etc. In some embodiments, different colors may be used for the markers to indicated different content such as original, video, images, re-shares, etc. The markers 732, 734 are advantageous because they unobtrusively indicate within the stream of content to the user that there is related content. The markers 732, 734 are positioned within the stream content and thus easily accessible to the user and in an area that is already the focus of the user's attention.

FIG. 7A represents the initial state for viewing the stream of content. As the user scrolls through the stream of content, the user interface is modified to be similar to the user interface represented in FIG. 7B. In particular, the stream of content header and properties area 702 is not shown in FIG. 7B to maximize the area for the plurality of tiles 704-722. The present disclosure advantageously provides the flick gesture upward or downward that is input by the user causes the interface to be updated from that shown in FIG. 7B to the user interface of FIG. 7A.

Figure 7C:
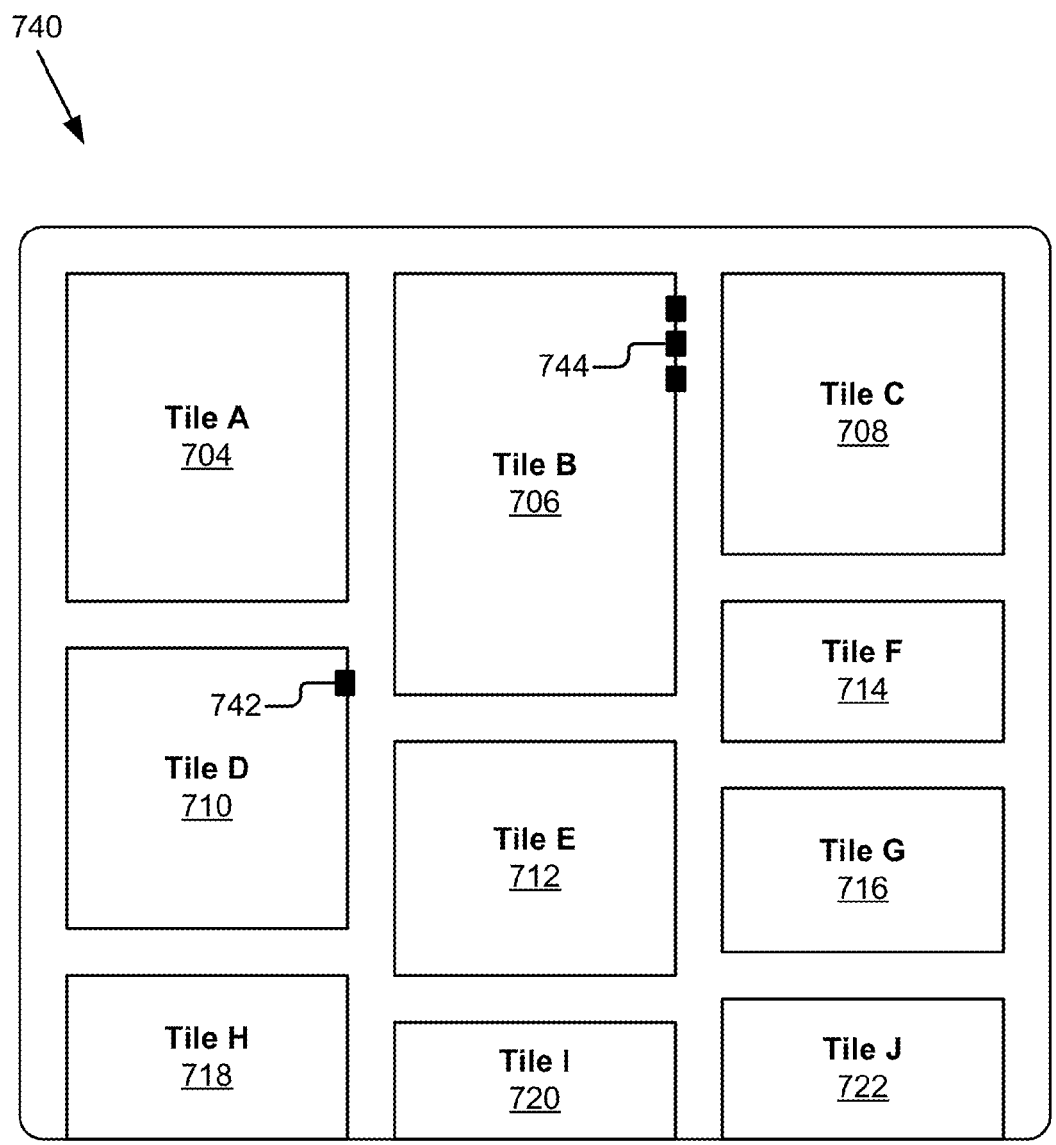

Referring now to FIG. 7C, a graphic representation of an example implementation of a user interface 740 for presenting a stream of content and markers or indicators 742, 744 of related content. In this example, the markers 742, 744 positioned proximate the left edge of the tiles. FIG. 7C illustrates how the markers 742, 744 may take a variety of different shape and formats from those of FIG. 7B.

Figure 7D:
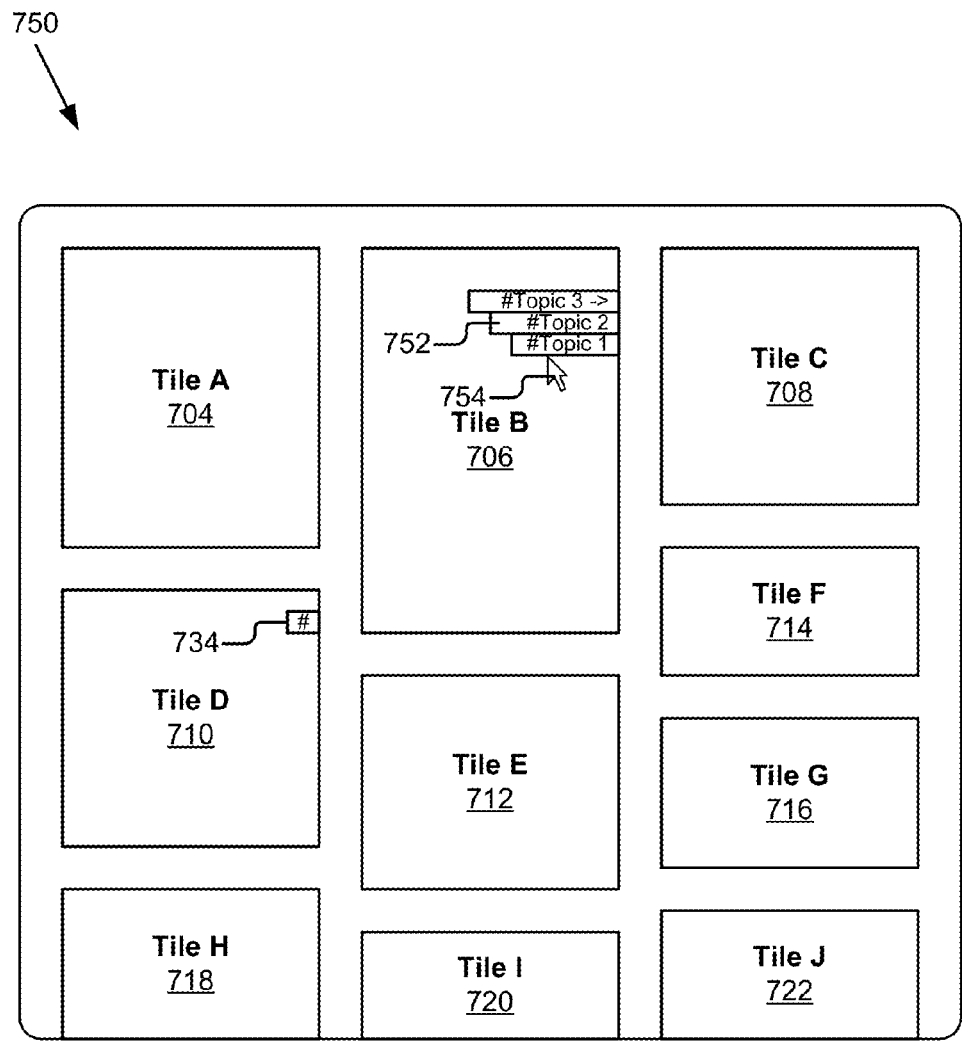

Referring now to FIG. 7D, a graphic representation of an example implementation of a user interface 750 where the markers provide additional information about the topics is shown. In some implementations, when the user positions the cursor 754 near or proximate the related content markers (see 732 of FIG. 7B), the markers 752 are adjusted in size and expanded to reveal the title of the topic to which the markers correspond. In this example, the three hash tags 732 of FIG. 7B are expanded out to be "#topic 3," "#topic 2," and "#topic 3." Comparing the markers 752 of tile B 706 to the marker 734 of tile D 710 illustrates the difference. Again, this feature of the interface 750 is particularly advantageous because the user is provided with additional information about the related topic without having to transition to a different window or screen and can remain in situ viewing the stream of content. More specifically, the related content markers 734 752 and information about the related topics are presented or interleaved into the stream seamlessly.

Figure 7E:
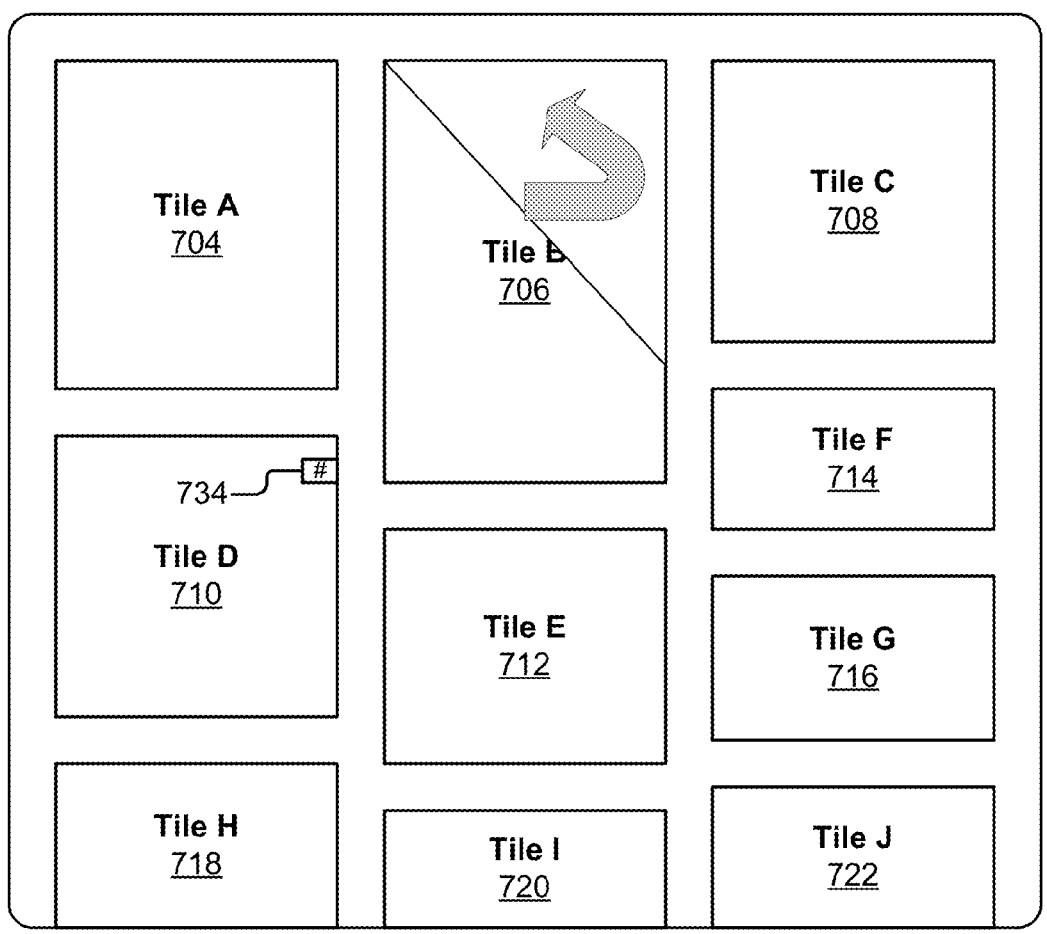
Figure 7F:
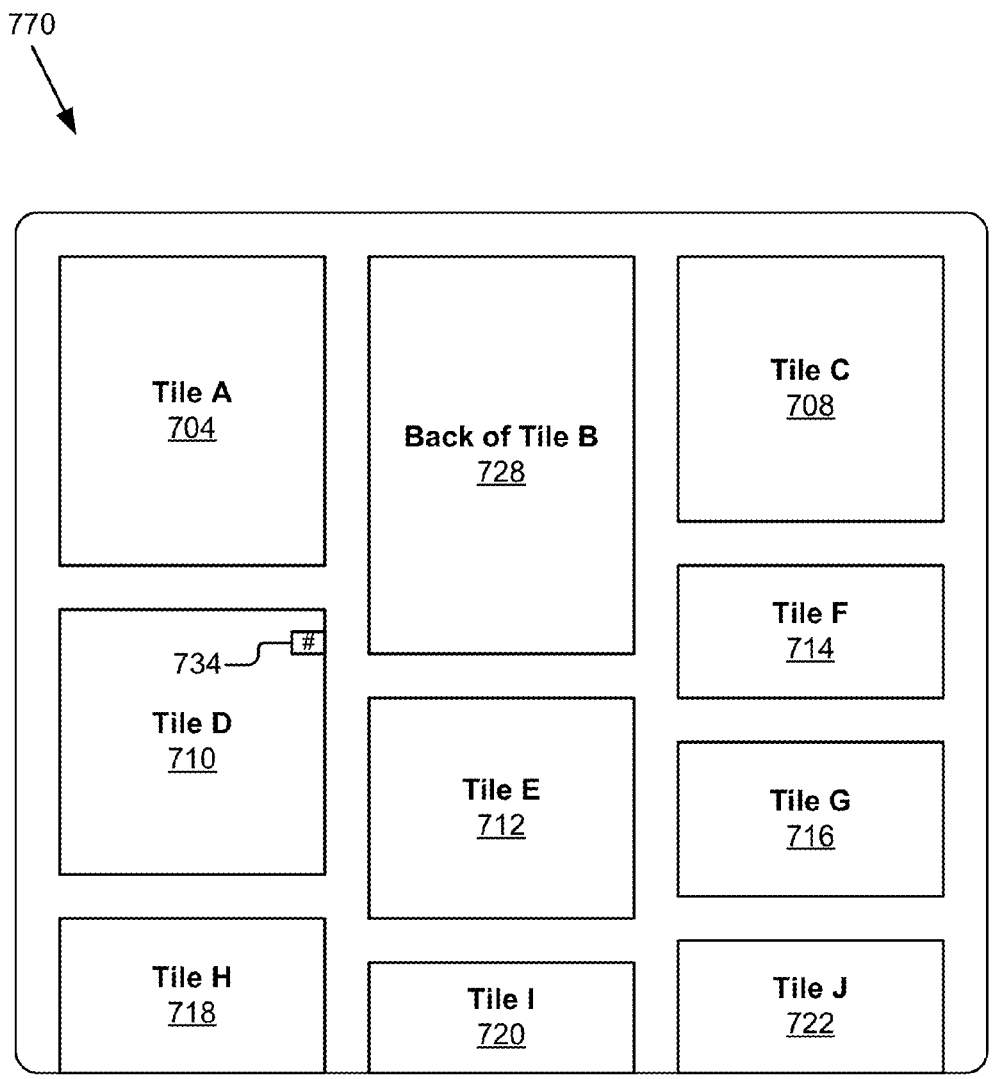

Referring now to FIGS. 7D, 7E and 7F, the transition from tile B 706 to the related content tile 728 will be illustrated and described. Once the user selects one of the markers 752 of tile 7B 706, the user interface 750 is transformed to the user interface 760 of FIG. 7E and then to the user interface 770 of FIG. 7F. The appearance of this transition is presented such that it appears that tile B 706 is flipping over to show the back of the tile 728. The user interface 760 of FIG. 7E represents the graphic of the tile flipping over to reveal the back of the tiles 728 is shown in the user interface 770 of FIG. 7F. The present technology advantageously uses a paradigm where each tile represents a card or deck of cards. Each card represents a content item in the stream of content. The back of each card represents related content on a particular topic to the front of the card. On the back of the card is not merely a single card that may be represented by a card deck of related content items through which the user may transition to view any of the related content items. The back of the cards and the card decks and transition through them are described in more detail below with reference to FIGS. 8A-8D. It should be understood that the related content module 103 may adjust the tile size of back of the tile 728 to accommodate the related content. The presentation module 308 certified correctly, fetches and render specific data that is part of the related content items.

Figure 7G:
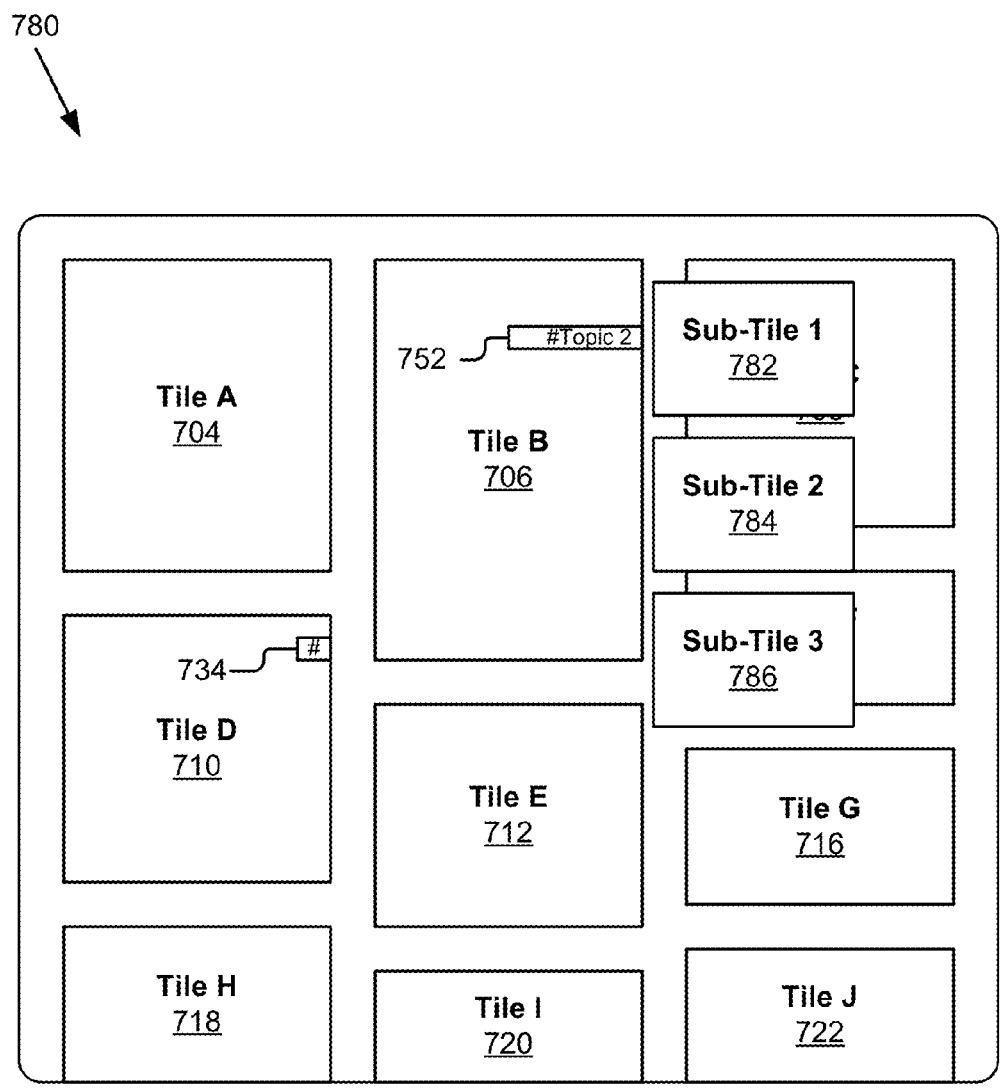

Referring now to FIG. 7G, a graphic representation of an example implementation of a user interface 780 where the related content is presented in a series of sub tiles 782, 784 and 786 is shown. In contrast to the user interface 770 of FIG. 7F where the related content is provided in place of tile B 706, the user interface 780 present the related content in a series of sub tiles 782, 784 and 786 that are positioned proximate tile B 706. In this implementation, the sub tiles 782, 784 and 786 are positioned to the right of tile B 706 over tile C 708 and tile F 714 partially at securing them. Once the user has selected a topic, the interface transitions from that of FIG. 7D to that of FIG. 7G. As shown in FIG. 7G, the extended label 752 corresponding to the topic that the user selected continues to be shown over tile B 706. Each of the sub tiles 782, 784 and 786 may include a post, video, image etc. related to the selected topic. In this implementation, the sub tiles 782, 784 and 786 are positioned to the left of tile B 706. It should be understood that the sub tiles could vary in shape and size and could also be positioned at other locations relative to tile B 706.

FIGS. 8A-8E are graphic representations of example user interfaces for the back tile 728 of FIG. 7F.

Figure 8A:
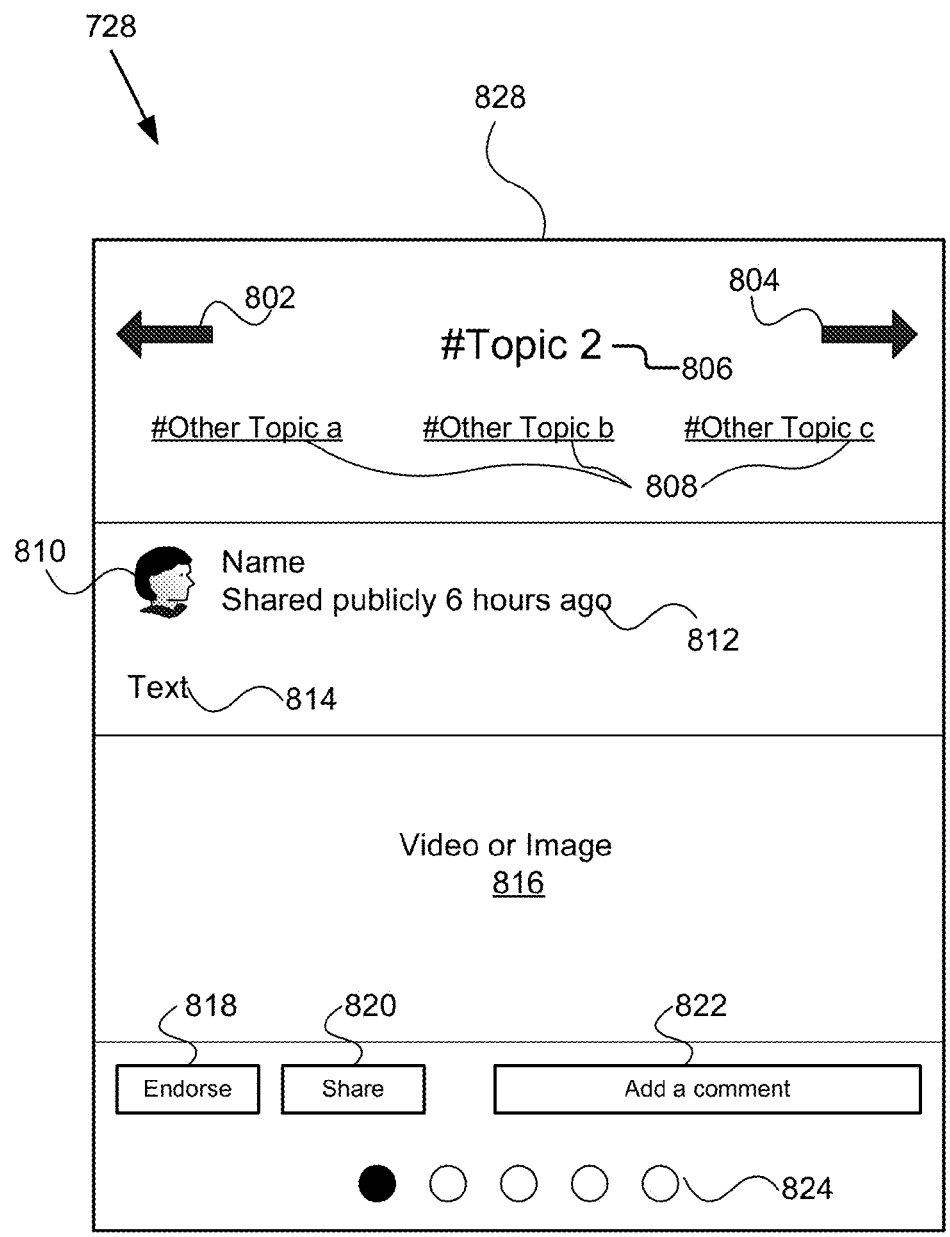
FIGS. 8A-8E are graphic representations of example user interfaces or tiles for related content.

Referring now to FIG. 8A, an example back tile 728 for presenting related content in a stream of content is shown. As has been noted above, the back tile 728 is displayed in the stream of content such as was shown and described above with reference to FIG. 7F. Once the related content module 103 has transitioned to presenting the back tile 728 indicating that a signal to retrieve additional related content has been received, that related content is retrieved and presented as back tile 828. Back tile 828 has a header section, a first content section, a second content section, and an action section. Each of these sections is described below.

The header section includes a back button 802, a forward button 804, a title label 806 and one or more other topic buttons or links 808. The back tile 828 represents a single card in a deck of cards. Each back card of the deck of cards presents a related content item. FIG. 8A illustrates a single back card 828 that is on the top of the deck. The back button 802 and the forward button 804 are selectable by the user to transition to the next or previous card in the deck. An indication of the number of related content cards in the deck is provided by the series of ellipses 824 in the action section of the card 828. In some implementations, one of the ellipses is shown in a highlighted manner to indicate the relative position of the card 828 being presented in the deck. In this case, the card 828 being presented is the top card and therefore the first ellipse in the series of ellipses is highlighted. The header section also includes the title label 806. In this example, the title label 806 has the title of the topic "#Topic 2." The title label 806 provides the general category to which the related content items pertain. Finally, the header section may optionally include one or more other topic buttons or links 808. These other topic buttons or links 808 are selectable by the user and provide the user with a mechanism to pivot to exploring or discovering additional related content. In some implementations, the other topics are subcategories of the topic of the card 828.

The first content section includes an image 810 of the user, context information 812 and a message 814. In this example, the first section includes a basic post with an image 810 of the person posting, the poster's name and information about when the post was made 812 and the text 814 of the post itself. It should be understood that in some implementations this portion of the card 828 may be omitted or only the text section may be omitted if the second content section 816 is populated.

The second content section 816 provides an area for presenting or displaying an image or video. The second content section 816 may also include other functional buttons to interact with the video or image. In some implementations, this portion of the card 828 may be omitted if there is no video or image content.

The final section of the card 828 is the action section. The action section includes a series of buttons 818, 820 and 822 for taking action relative to this content item. For example, the action section may include an endorsement button 818, a sharing button 820 and box 822 for adding a comment and posting the comment. The action section may also include an indication 824 of relative position of the card 828 to other cards (not shown) representing related content in a deck of cards.

Figure 8B:
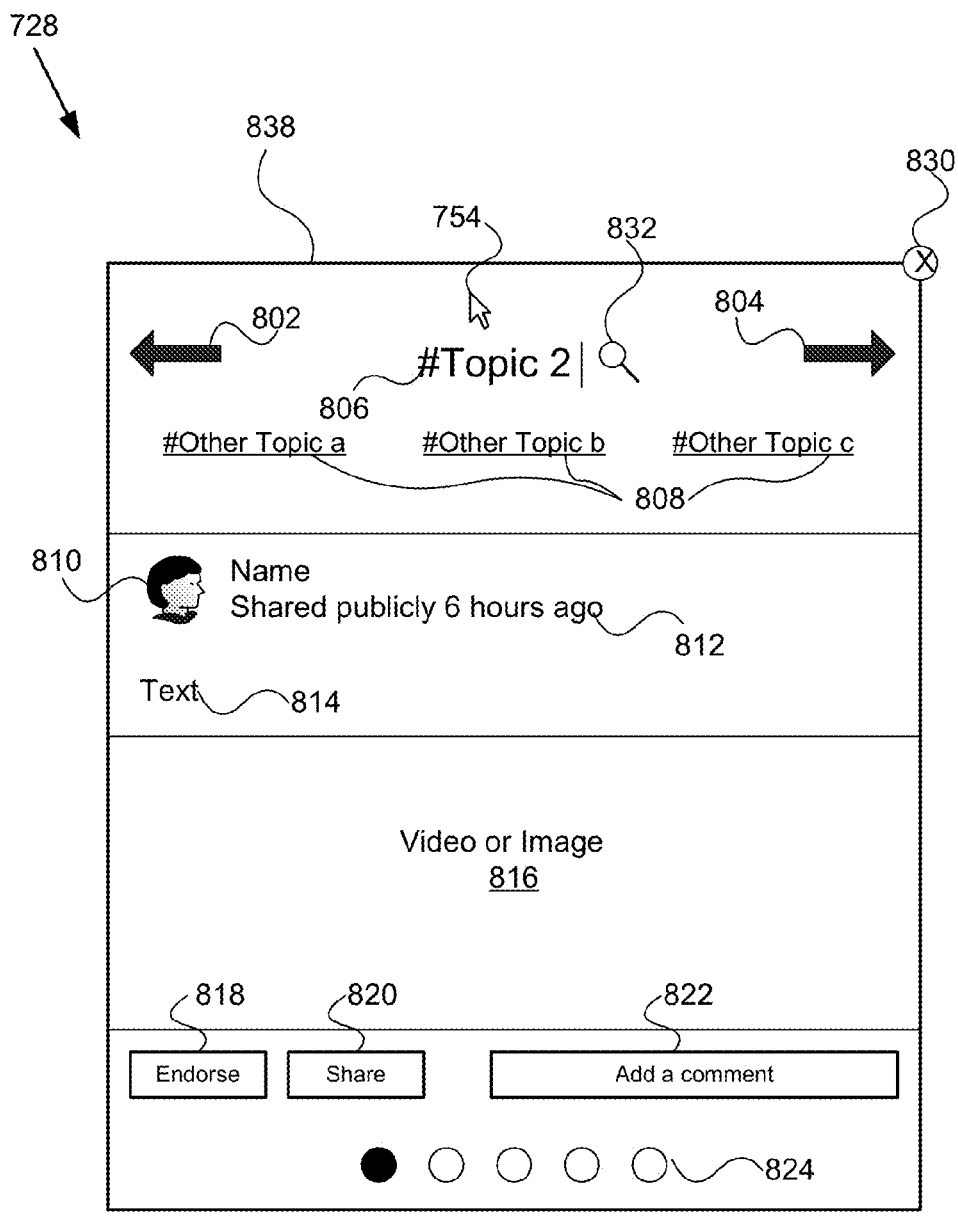
Figure 8C:
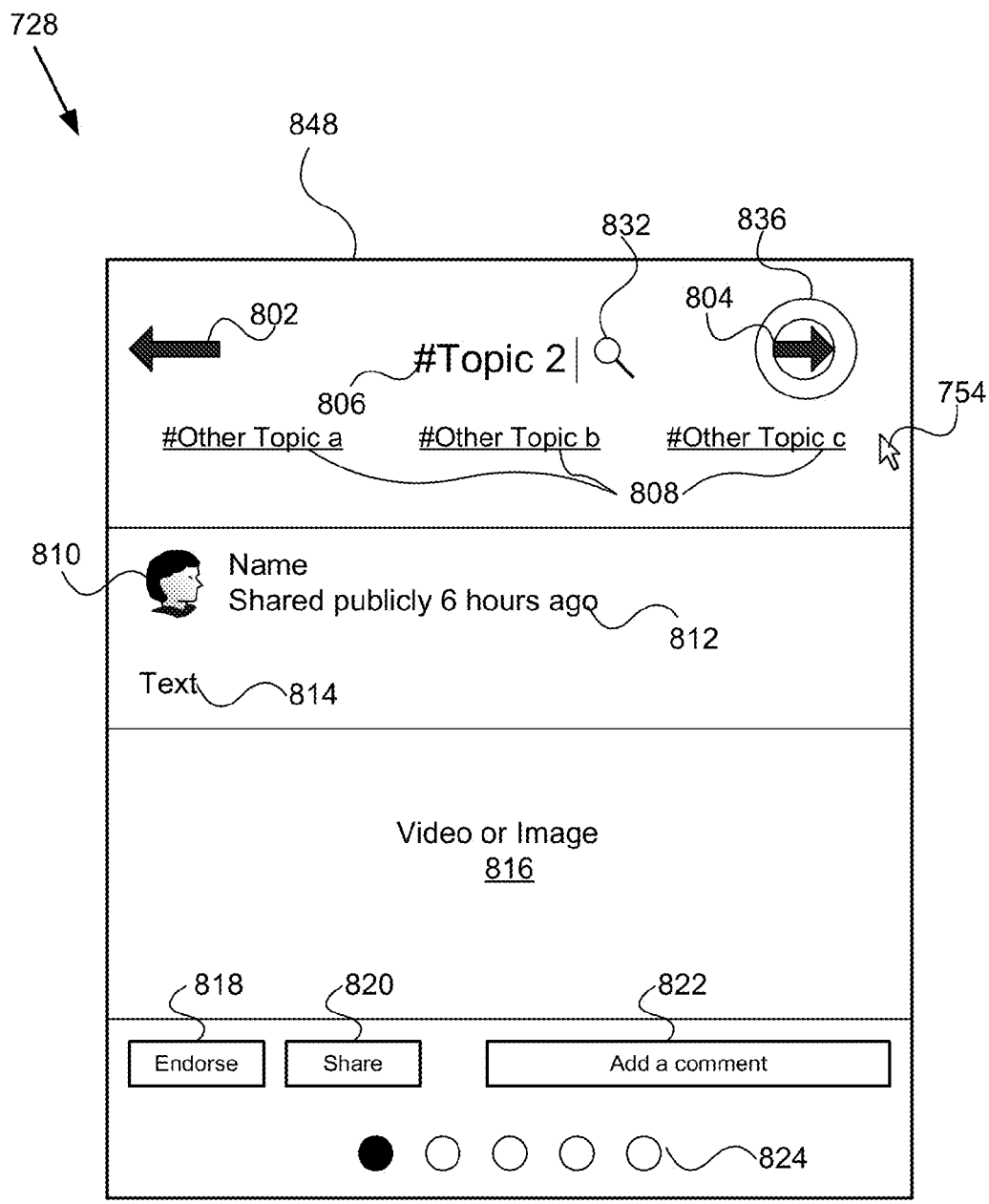

Referring now to FIG. 8B, an example back tile 838 for presenting related content in a stream of content is shown. In this example, the cursor 754 of the user is positioned over the header section. This causes the presentation module 308 to update the interface to include a search button 832 that is positioned proximate the title label 806. Selection of the search button 832 causes a search box to be presented over the back tile with an area for the user to input search terms. This causes the presentation module 308 to update the interface to include a button 834 for closing the back tile 838 and reverting back to the stream of content interface depicted in FIG. 7B.

Referring now to FIG. 8C, an example back tile 838 for presenting related content in a stream of content is shown. In this example, the cursor 754 of the user is positioned over the header section near the forward button 804. This causes the presentation module 308 to update the interface to show the forward button 804 in a visually distinct manner. For example, before button 804 may be highlighted with circles of shaded background. This provides a feedback signal to the user indicating that additional related content is available as well as that the forward button 804 may be selected.

Figure 8D:
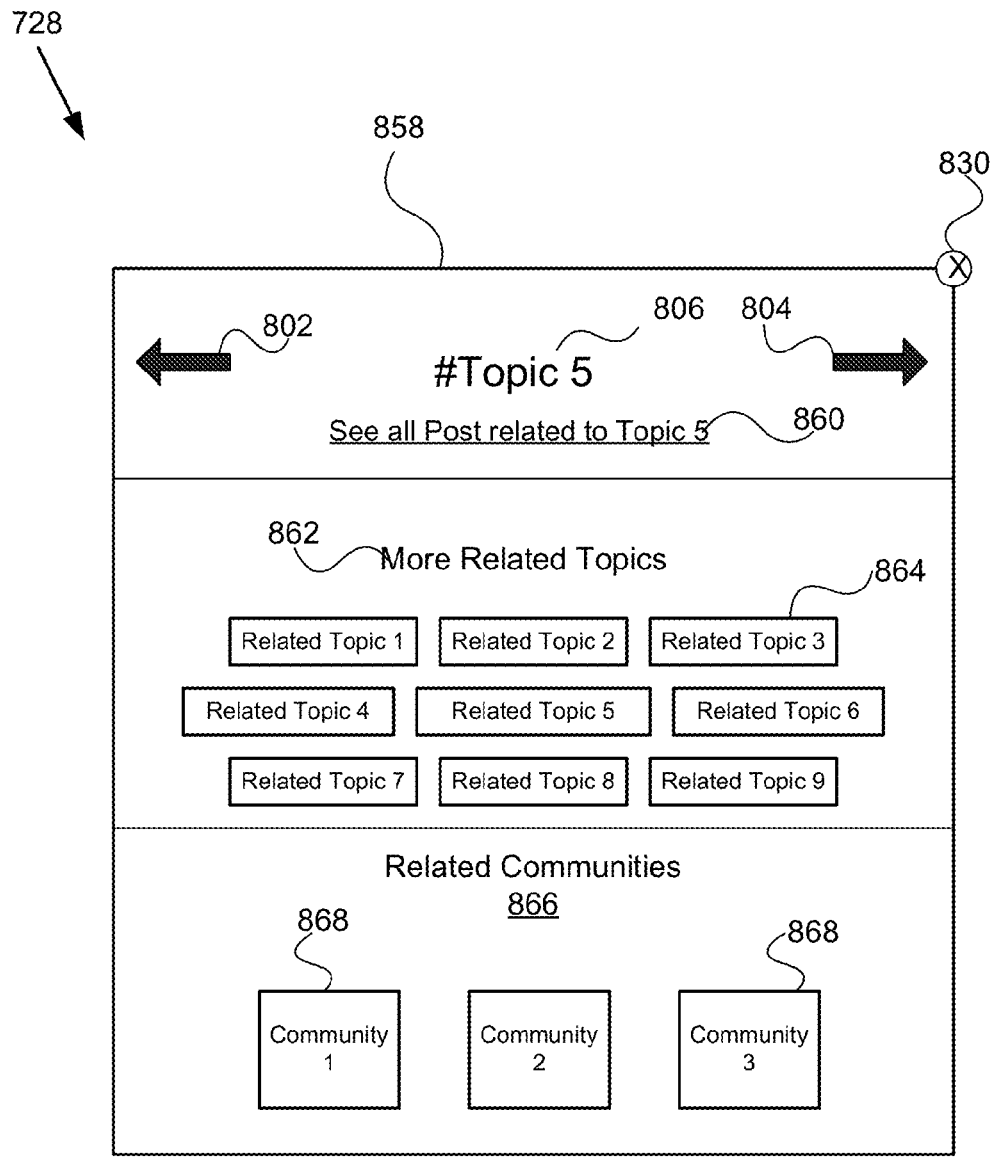

Referring now to FIG. 8D, another example back tile 858 is shown. In particular, the back tile 858 is a tombstone that is presented to the user after all the tiles in the card deck have been presented to the user. The header section of the back tile 858 is modified to include a button or link 860 to transition to the presentation of all posts related to the topic. Additionally, the first content section has a label 862 identifying related topics and a plurality of buttons 864 allowing presentation of a new slide deck in situ in place of the existing tile 858 on another related topic. The second content section 866 is provided for information about related communities. This section 866 includes a plurality of buttons 868 selectable by the user to cause the system to display information about those respective communities. Since this tile 858 is a vehicle for transitioning to the presentation of other information, there is no action section.

Figure 8E:
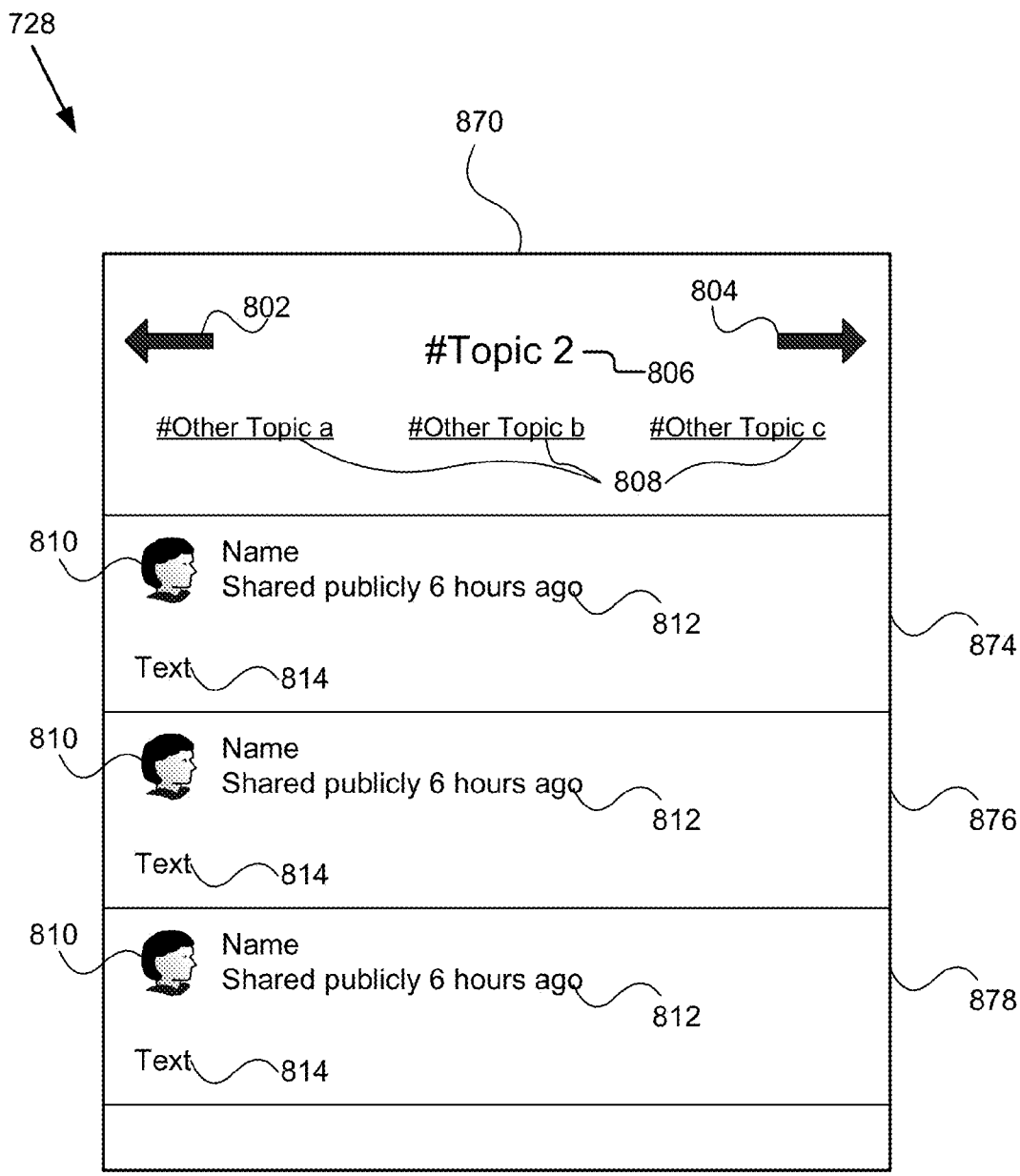

Referring now to FIG. 8E, yet another example back tile 870 is shown. In this example, the back tile 870 a header section similar to the other back tiles described above with reference to FIGS. 8A-8D. However, instead of a single post about a related content item, the back tile 870 includes an area for presenting multiple posts 874, 876 and 878. Such a back tile 870 may be used to present all the posts related to a particular topic or an alternate format where a single card as opposed to a deck of card is used to present multiple items of related content.

Referring now to FIGS. 9A-9D, the automatic updating of the interface in response to gestures or cursor movement is shown. As described above with reference to FIG. 6, the presentation module 308 automatically modifies the interface to present the toolbar and other information in response to gestures or cursor movements input by the user. For example, if the user scrolls up at a normal velocity, the presentation module 308 transitions from the user interface 730 of FIG. 7B to the interface 900 of FIG. 9A. The interface 900 of FIG. 9A differs from that of FIG. 7B in that a header and properties toolbar 902 is displayed along the top of the interface 900. The header and properties toolbar 902 can include a home button as well as other user defined groups to filter the stream of content.

Figure 9A:
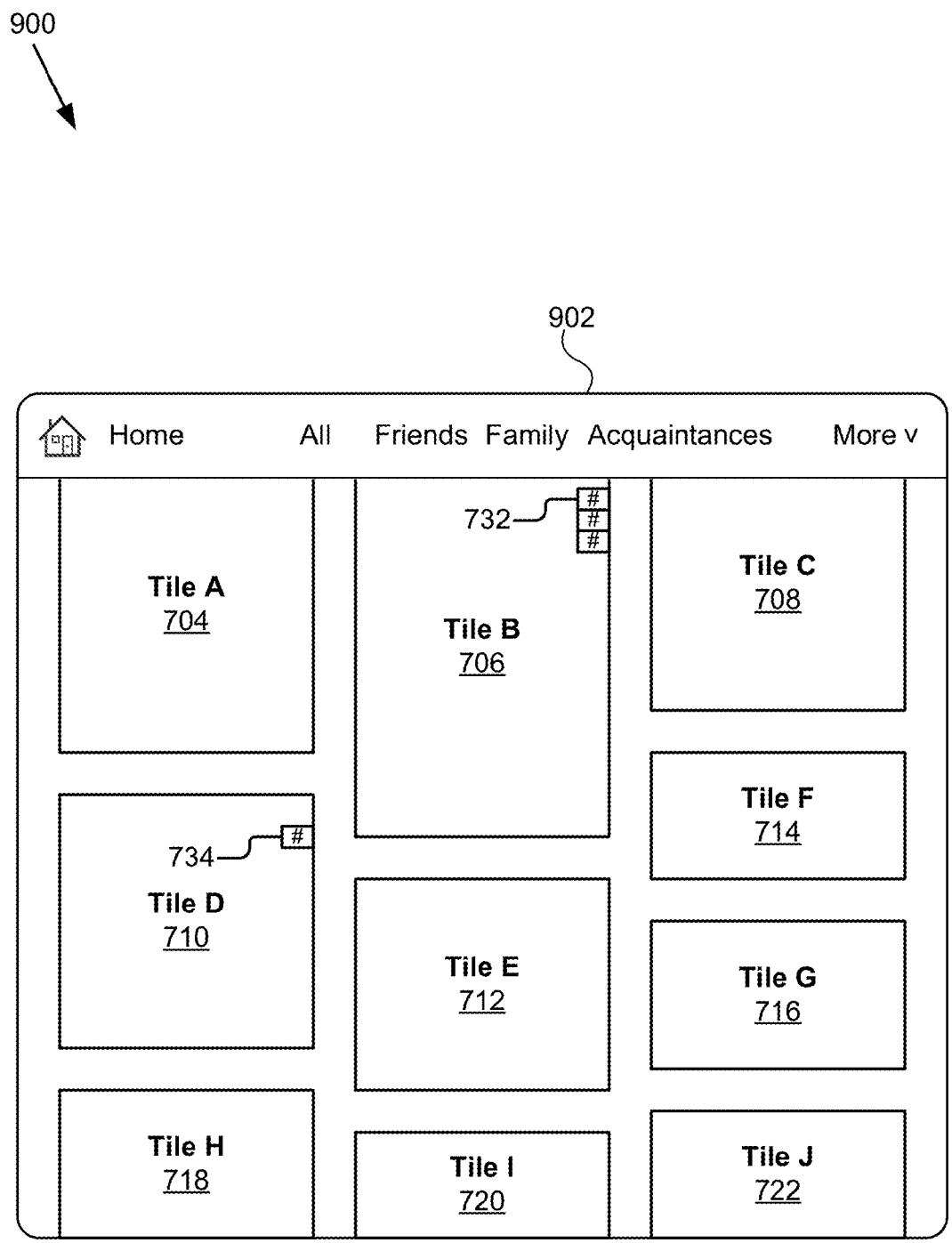
FIGS. 9A-9D are graphic representations of example user interfaces updated with additional information because of gestures or direction and velocity of user input.
Figure 9B:
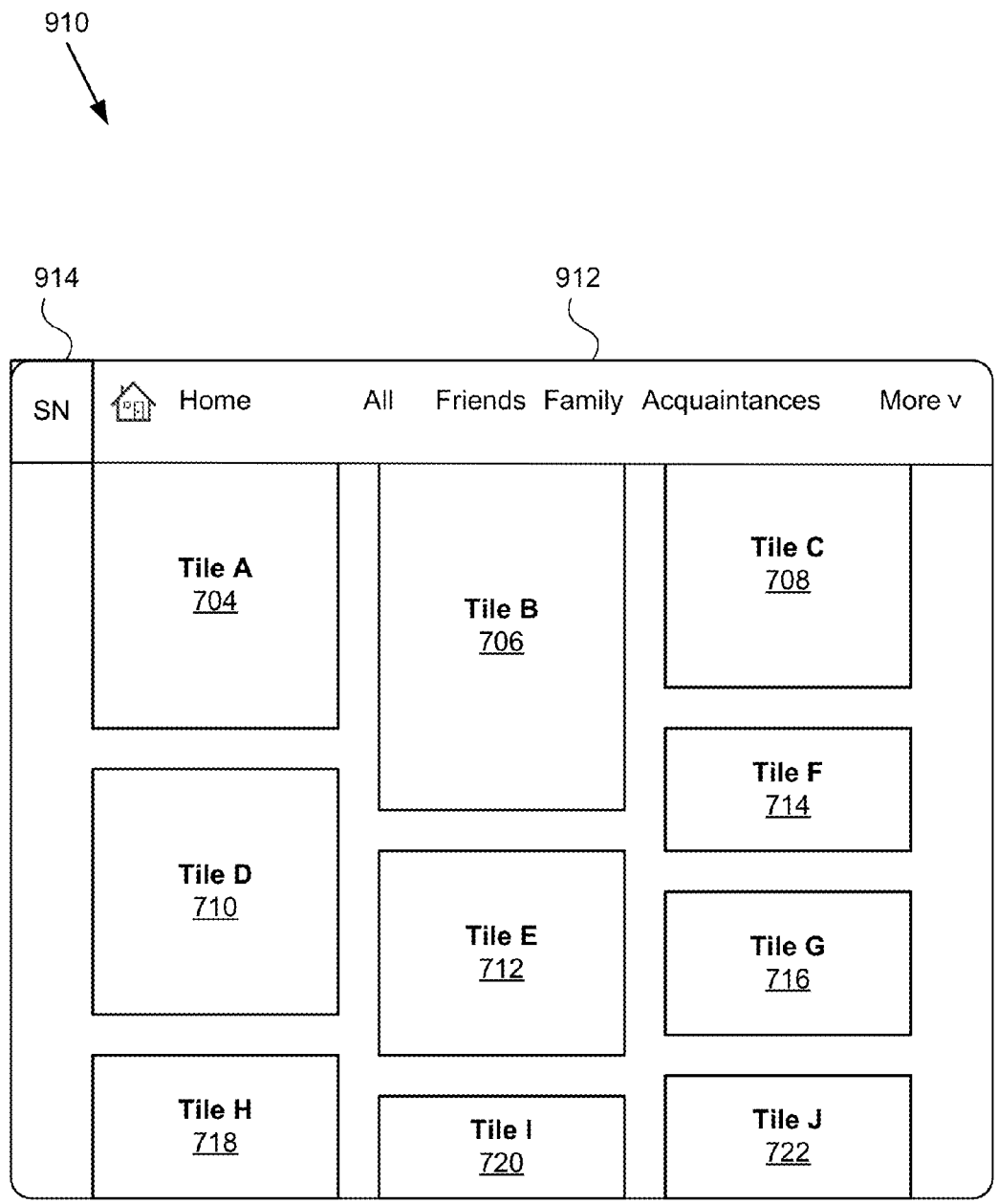

Referring now to FIG. 9B, an example user interface 910 that is provided by the presentation module 308 automatically in response to movement of the cursor downward at a velocity is shown. For example, the presentation module 308 transitions from the user interface 730 of FIG. 7B to the interface 910 of FIG. 9B if the user scrolls up at a normal velocity above a predetermined threshold. The interface of FIG. 9B includes a properties bar 912 and a button or link 914 to access the social network. The properties bar 912 is similar to that of FIG. 9A.

Figure 9C:
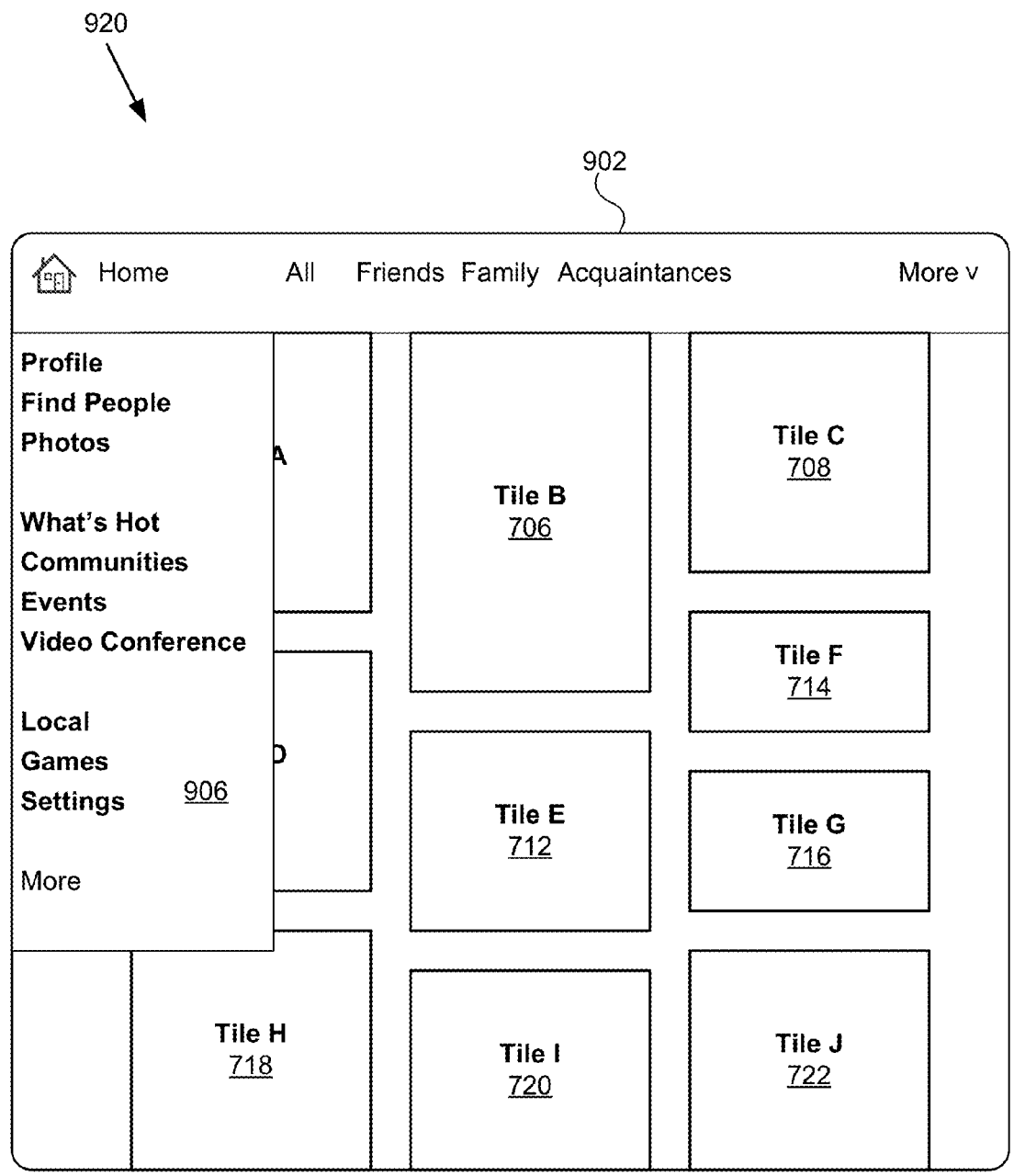

Referring now to FIG. 9C, an example user interface 920 that is provided by the presentation module 308 automatically in response to movement of the cursor downward at a velocity is shown. For example, the presentation module 308 transitions from the user interface 730 of FIG. 7B to the interface 920 of FIG. 9C if the user scrolls up at a normal velocity above a predetermined threshold. In some implementations, the threshold for transitioning to the user interface 920 of FIG. 9C is different and greater than the threshold required to produce the interface 910 of FIG. 9B. For example, moving the cursor downward a greater velocity produces interface 920 which includes the header and properties toolbar 902 and also causes the presentation module 308 to present the sidebar 906 that shows links to various functional aspects of the social network. It should be understood that depending on the direction and velocity of the cursor movement input by the user, various different displays that may be useful in the context of reviewing the stream of content can automatically be presented and provided.

Figure 9D:
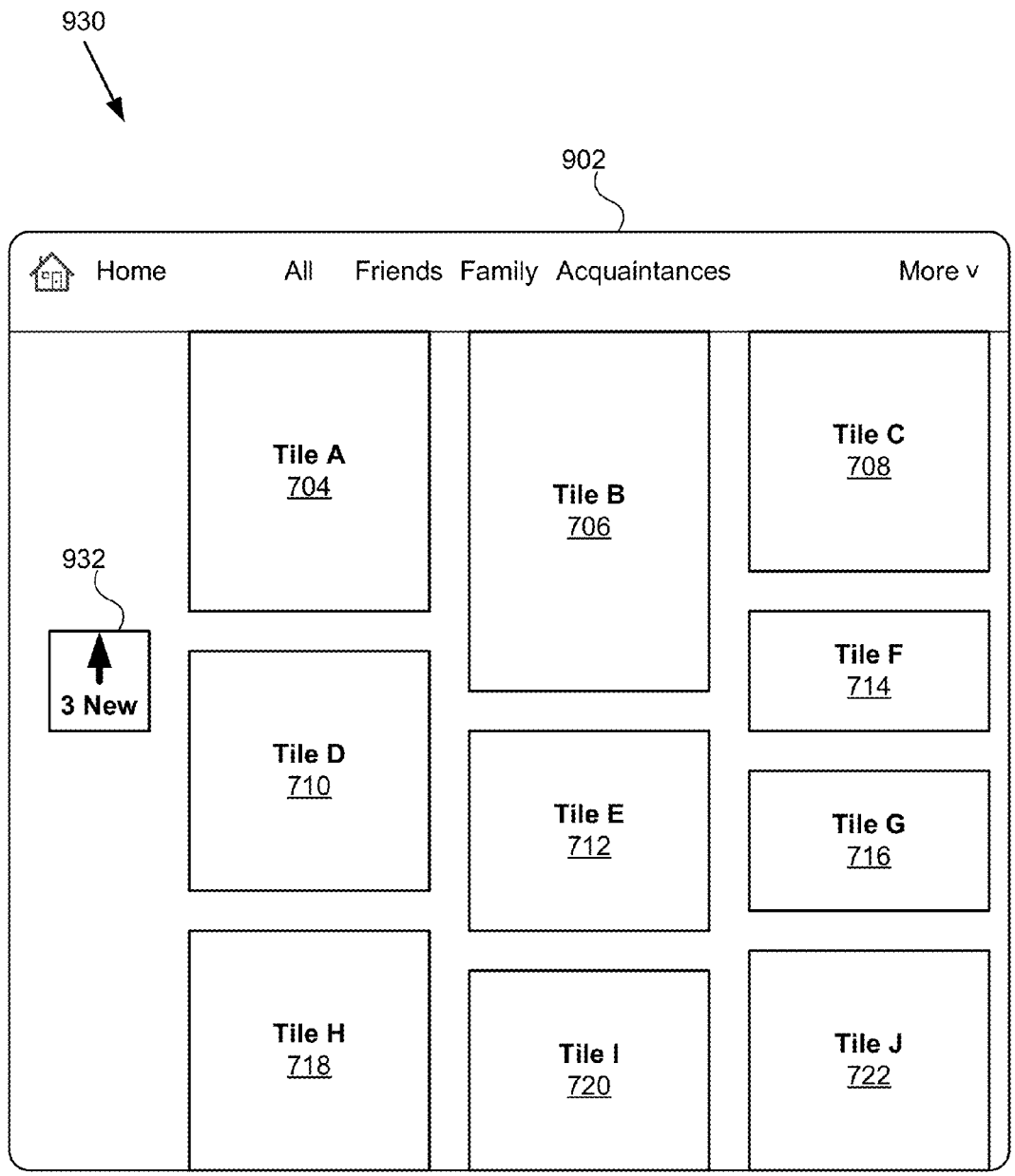

Referring now to FIG. 9D, an example user interface 930 that is provided by the presentation module 308 automatically is shown. In some implementations, the interface 930 is generated and provided by the presentation module 308 in response to movement of the cursor upward at a velocity. In some implementations, the user interfaces generated and provided by the presentation module in response to new content items being available for the stream of content of the user. In some implementations, the user interface 930 is generated in response to both conditions. The user interface 930 includes the header and properties toolbar 902 as described above with regard to other interfaces. However, the user interface 930 also includes an indication 932 of direction of the location of new post to the stream of content, and the number of new posts that have been added to the stream content. This user interface 930 and the other user interfaces are particularly advantageous because they provide the user with information automatically in response to the user's interaction with the stream of content.

Systems and methods for presenting related content in situ in a stream of content have been described. While the present disclosure is described in the context of a social network, it should be understood that the terms "products" and "services" are used interchangeably throughout this specification and are used herein to encompass their plain and ordinary meaning including, but not limited to any online service, online product, online software that provides online endorsement services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer implemented method, comprising:
receiving a stream of content including a plurality of content items;
retrieving a plurality of related content items;
identifying a topic for at least one of the plurality of the related content items;
ranking the topics by relevance to a user and one of the plurality of content items;
associating the topic to the content item in the stream of content where the topic is ranked as being relevant to the content item;
generating a marker for the topic;
generating a user interface including one or more tiles and the generated marker rendered with at least one tile, the one or more tiles being an element on the user interface, each of the one or more tiles corresponding to a content item in the stream of content, and the generated marker being presented as a hash tag rendered with the at least one tile and representing association with the content item on the tile providing the user interface for display;
translating a user input from the user interface to navigation of the user interface; and
updating the user interface based on the user input navigation and placement of the marker.

2. The method of claim 1 comprising updating the user interface to show the topics associated with the marker in response to input of cursor movement proximate the marker.

3. The method of claim 1 comprising:
receiving input selecting a topic;
generating a tile including the related content item corresponding to the topic; and
providing the tile for display in situ in place of the content item in the stream of content.

4. The method of claim 1 wherein there are a plurality of markers generated for the topic, and a predetermined number of markers are displayed with the content item in the stream of content.

5. The method of claim 1 wherein there are less than a predefined percentage of content items that have markers for topics associate with the content items.

6. The method of claim 1 wherein the plurality of related content items are algorithmically surfaced from a social network content source to retrieve high quality topics per content item.

7. The method of claim 1 wherein a vector and a direction of input are used to update the generated user interface to show in situ with the stream of content, control or status information.

8. A computer program product comprising a computer usable medium including a computer readable program, wherein the computer readable program when executed on a computer causes the computer to perform:
receiving a stream of content including a plurality of content items;
retrieving a plurality of related content items;
identifying a topic for at least one of the plurality of the related content items;
ranking the topics by relevance to a user and one of the plurality of content items;
associating the topic to the content item in the stream of content where the topic is ranked as being relevant to the content item;
generating a marker for the topic;
generating a user interface including one or more tiles and the generated marker rendered with at least one tile, the one or more tiles being an element on the user interface, each of the one or more tiles corresponding to a content item in the stream of content, and the generated marker being presented as a hash tag rendered with the at least one tile and representing association with the content item on the tile;
providing the user interface for display;
translating a user input from the user interface to navigation of the user interface; and
updating the user interface based on the user input navigation and placement of the marker.

9. The computer program product of claim 8 wherein the computer readable program when executed on a computer also causes the computer to perform updating the user interface to show the topics associated with the marker in response to input of cursor movement proximate the marker.

10. The computer program product of claim 8 wherein the computer readable program when executed on a computer also causes the computer to perform:
receiving input selecting a topic;
generating a tile including the related content item corresponding to the topic; and
providing the tile for display in situ in place of the content item in the stream of content.

11. The computer program product of claim 8 wherein there are a plurality of markers generated for the topic, and a predetermined number of markers are displayed with the content item in the stream of content.

12. The computer program product of claim 8 wherein there are less than a predefined percentage of content items that have markers for topics associate with the content items.

13. The computer program product of claim 8 wherein the plurality of related content items are algorithmically surfaced from a social network content source to retrieve high quality topics per content item.

14. The computer program product of claim 8 wherein a vector and a direction of input are used to update the generated user interface to show in situ with the stream of content, control or status information.

15. A system comprising:
a processor, and;
a memory storing instructions that, when executed, cause the system to:
- receive a stream of content including a plurality of content items;
- retrieve a plurality of related content items;
- identify a topic for at least one of the plurality of the related content items;
- rank the topics by relevance to a user and one of the plurality of content items;
- associate the topic to the content item in the stream of content where the topic is ranked as being relevant to the content item;
- generate a marker for the topic;
- generate a user interface including one or more tiles and the generated marker rendered with at least one tile, the one or more tiles being an element on the user interface, each of the one or more tiles corresponding to a content item in the stream of content, and the generated marker being presented as a hash tag rendered with the at least one tile and representing association with the content item on the tile;

provide the user interface for display;
translate a user input from the user interface to navigation of the user interface; and
update the user interface based on the user input navigation and placement of the marker.

16. The system of claim 15 wherein the memory also stores instructions that, when executed, cause the system to update the display to show the topics associated with the marker in response to input of cursor movement proximate the marker.

17. The system of claim 15 wherein the memory also stores instructions that, when executed, cause the system to:
- receive input selecting a topic;
- generate a tile including the related content item corresponding to the topic; and
- provide the tile for display in situ in place of the content item in the stream of content.

18. The system of claim 15 wherein there are a plurality of markers generated for the topic, and a predetermined number of markers are displayed with the content item in the stream of content.

19. The system of claim 15 wherein there are less than a predefined percentage of content items that have markers for topics associate with the content items.

20. The system of claim 15 wherein the plurality of related content items are algorithmically surfaced from a social network content source to retrieve high quality topics per content item.

21. The system of claim 15 wherein a vector and a direction of input are used to update the user interface to show in situ with the stream of content, control or status information.

* * * * *